US012724212B2

(12) United States Patent
Psaila

(10) Patent No.: US 12,724,212 B2
(45) Date of Patent: Sep. 1, 2026

(54) TECHNOLOGIES FOR A BEAM EXPANSION FOR VERTICALLY-EMITTING PHOTONIC INTEGRATED CIRCUITS

(71) Applicant: Intel Corporation, Santa Clara, CA (US)

(72) Inventor: Nicholas D. Psaila, Lanark (GB)

(73) Assignee: Intel Corporation, Santa Clara, CA (US)

(*) Notice: Subject to any disclaimer, the term of this patent is extended or adjusted under 35 U.S.C. 154(b) by 52 days.

(21) Appl. No.: 17/871,647

(22) Filed: Jul. 22, 2022

(65) Prior Publication Data

US 2024/0027700 A1 Jan. 25, 2024

(51) Int. Cl.
*G02B 6/42* (2006.01)

(52) U.S. Cl.
CPC .................................. *G02B 6/4214* (2013.01)

(58) Field of Classification Search
CPC ................................ G02B 6/4214; G02B 6/42
See application file for complete search history.

(56) References Cited

U.S. PATENT DOCUMENTS

| | | | |
|---|---|---|---|
| 5,633,527 | A | 5/1997 | Lear |
| 6,733,189 | B2 | 5/2004 | Hurt et al. |
| 7,045,089 | B2 | 5/2006 | Afromowitz |
| 9,793,424 | B2 | 10/2017 | Cho et al. |
| 10,481,334 | B2 | 11/2019 | Israel et al. |
| 10,488,605 | B1 | 11/2019 | Budd et al. |
| 10,866,367 | B2 | 12/2020 | Borrelli et al. |
| 11,531,171 | B2 | 12/2022 | Menezo |
| 11,894,474 | B2 | 2/2024 | Dobriyal et al. |
| 2002/0118907 | A1 | 8/2002 | Sugama et al. |
| 2004/0223761 | A1 | 11/2004 | Kropp |
| 2005/0213873 | A1 | 9/2005 | Piede et al. |
| 2006/0239605 | A1 | 10/2006 | Palen et al. |
| 2007/0293044 | A1 | 12/2007 | Perozziello et al. |

(Continued)

FOREIGN PATENT DOCUMENTS

| | | | |
|---|---|---|---|
| CN | 110637246 | A | 12/2019 |
| JP | 2001141965 | A | 5/2001 |

(Continued)

OTHER PUBLICATIONS

USPTO; Notice of Allowance issued in U.S. Appl. No. 17/120,039, dated Oct. 11, 2024; 9 pages.

(Continued)

*Primary Examiner* — Jennifer Doan
(74) *Attorney, Agent, or Firm* — Alliance IP, LLC

(57) ABSTRACT

Technologies for beam expansion for vertically-emitting photonic integrated circuits are disclosed. In the illustrative embodiment, waveguides in a photonic integrated circuit (PIC) die guide light to vertical couplers, which direct the light from the waveguides out of the top surface of the PIC die. A glass microoptic substrate is mounted on the top surface of the PIC die, positioned over the vertical couplers. A mirror in the glass microoptic substrate reflects the light from the vertical couplers to propagate in a direction parallel to the top surface of the PIC die. Another set of mirrors in the glass microoptic substrate focus the light from each waveguide into a collimated beam directed out of the top surface of the glass microoptic substrate.

25 Claims, 15 Drawing Sheets

(56) References Cited

U.S. PATENT DOCUMENTS

| | | | |
|---|---|---|---|
| 2012/0141143 A1 | 6/2012 | Hayashi et al. | |
| 2015/0318952 A1 | 11/2015 | Butrie et al. | |
| 2016/0049528 A1 | 2/2016 | Cho et al. | |
| 2016/0266322 A1* | 9/2016 | Epitaux | G02B 6/2938 |
| 2017/0261703 A1* | 9/2017 | Bowen | G02B 6/423 |
| 2018/0031791 A1 | 2/2018 | Israel et al. | |
| 2018/0045891 A1 | 2/2018 | Israel et al. | |
| 2018/0335566 A1 | 11/2018 | Menezo et al. | |
| 2019/0123109 A1 | 4/2019 | Xie et al. | |
| 2019/0265421 A1 | 8/2019 | Ji et al. | |
| 2019/0324211 A1 | 10/2019 | Israel et al. | |
| 2020/0168749 A1 | 5/2020 | Nishimura et al. | |
| 2020/0278508 A1 | 9/2020 | Israel et al. | |
| 2021/0003777 A1 | 1/2021 | Israel et al. | |
| 2021/0058159 A1 | 2/2021 | Krichevsky et al. | |
| 2021/0132306 A1 | 5/2021 | Krichevsky et al. | |
| 2021/0165165 A1 | 6/2021 | Israel et al. | |
| 2021/0271037 A1 | 9/2021 | Brusberg et al. | |
| 2023/0077633 A1 | 3/2023 | Liu et al. | |
| 2024/0027700 A1 | 1/2024 | Psaila | |

FOREIGN PATENT DOCUMENTS

| | | |
|---|---|---|
| JP | 2004302459 A | 10/2004 |
| JP | 2008530641 A | 8/2008 |

OTHER PUBLICATIONS

USPTO; Non-Final Office Action issued in U.S. Appl. No. 17/561,286, dated Mar. 3, 2025; 8 pages.

USPTO; Non-Final Office Action issued in U.S. Appl. No. 17/561,694, dated Mar. 6, 2025; 13 pages.

Butkute, Agne et al., "Optimization of Selective Laser Etching (SLE) for Glass Micromechanical Structure Fabrication," Optics Express 23487, vol. 29, No. 15/19, Jul. 2021 (13 pages).

EPO; Extended European Search Report issued in EP Patent Application No. 21197110.6, dated Mar. 28, 2022; 8 pages.

Marchetti, Riccardo et al., "Coupling Strategies for Silicon Photonics Integrated Chips [Invited]," Photonics Research 201, Vo. 7, No. 2/ Feb. 2019 (39 pages).

U.S. Appl. No. 17/869,372, filed Jul. 20, 2022, inventors Nicholas D. Psaila et al.

U.S. Appl. No. 17/561,286, filed Dec. 23, 2021; 38 pages.

U.S. Appl. No. 17/561,694, filed Dec. 23, 2021; 36 pages.

USPTO; Non-Final Office Action issued in U.S. Appl. No. 17/120,039, dated Jan. 30, 2024; 15 pages.

USPTO; Non-Final Office Action issued in U.S. Appl. No. 17/120,039, dated May 16, 2024; 10 pages.

EPO; Office Action issued in EP Patent Application No. 21197110.6, dated Jan. 8, 2025; 6 pages.

Noriki, Akihiro, et al.; "45-degree curved micro-mirror for vertical optical I/O of silicon photonics chip;" Optics Express, vol. 27, No. 14; Jul. 8, 2019; 9 pages.

USPTO; Non-Final Office Action issued in U.S. Appl. No. 17/869,372; 13 pages.

USPTO; Notice of Allowance issued in U.S. Appl. No. 17/561,694; 8 pages.

Yu, Shaoliang, et al.; "Optical Free-Form Couplers for High-density Integrated Photonics (OFFCHIP): a universal optical interface;" MIT Libraries—Open Access Articles; Jan. 13, 2020; 9 pages.

USPTO; Non-Final Office Action issued in U.S. Appl. No. 17/869,372, dated Jun. 1, 2026.

* cited by examiner

1500

PROCESSOR UNIT 1502

COMMUNICATION COMPONENT 1512

MEMORY 1504

BATTERY/POWER 1514

DISPLAY DEVICE 1506

GNSS DEVICE 1518

AUDIO OUTPUT DEVICE 1508

AUDIO INPUT DEVICE 1524

AN OTHER OUTPUT DEVICE 1510

AN OTHER INPUT DEVICE 1520

ANTENNA 1522

TECHNOLOGIES FOR A BEAM EXPANSION FOR VERTICALLY-EMITTING PHOTONIC INTEGRATED CIRCUITS

BACKGROUND

Photonic integrated circuits (PICs) can be used for several applications, such as communications. Efficiently and cheaply aligning optics to couple light into and out of PICs can be a challenge. Approaches such as attachment of optical fiber arrays to PICs may be slow, incompatible with conventional semiconductor packaging processes, and can result in substantial yield and throughput issues.

DETAILED DESCRIPTION

Figure 1:
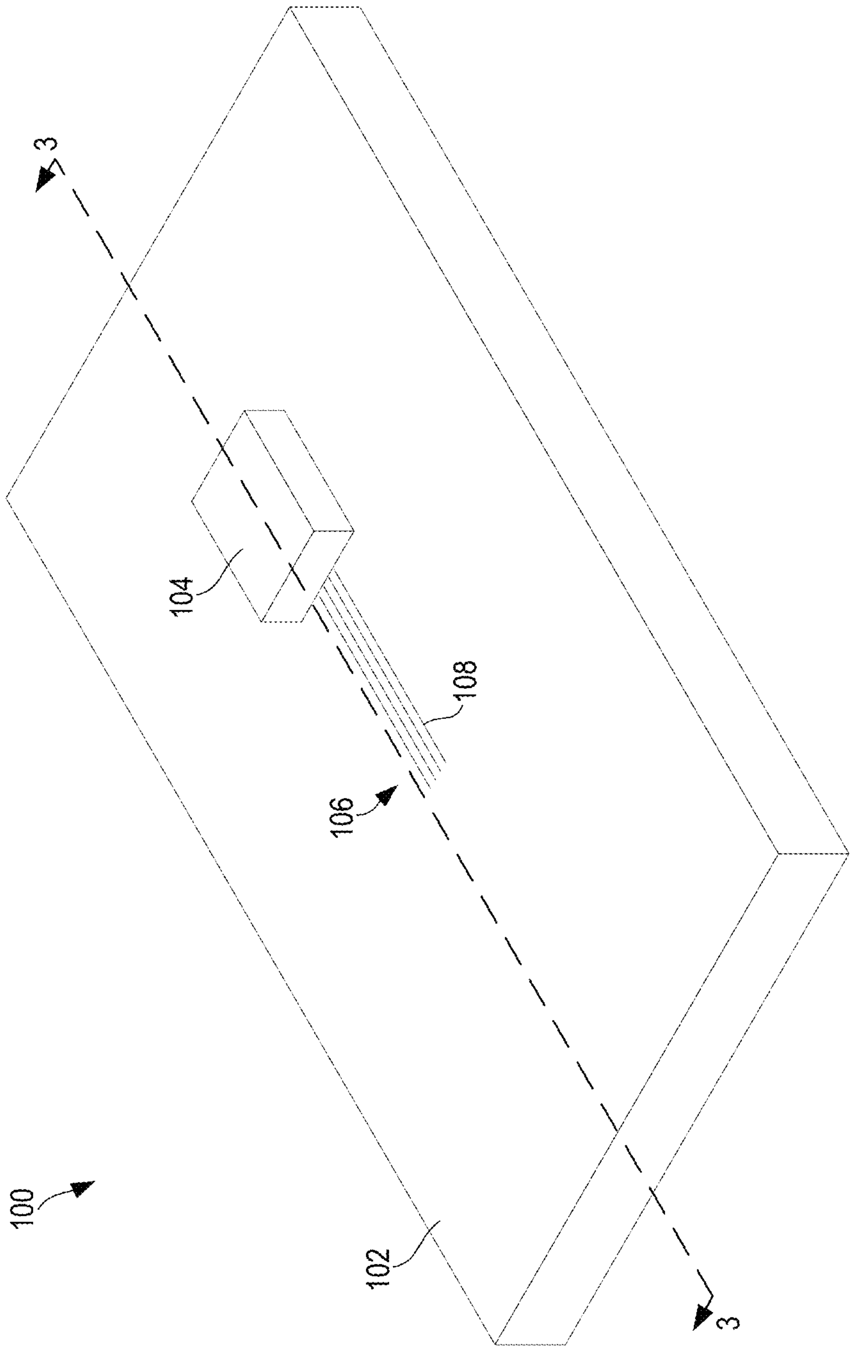
FIG. 1 is an isometric view of a system including a photonic integrated circuit (PIC) die with a glass microoptic substrate mounted on it.

In various embodiments disclosed herein, a photonic integrated circuit (PIC) die includes one or more waveguides with vertical couplers, directing the light out of the top surface of the PIC die. A glass microoptic substrate is positioned over the PIC die. In the illustrative embodiment, a micromirror in the glass substrate reflects the beam to propagate parallel to the surface of the PIC die. A second micromirror in the glass substrate then collimates the beam, directing it out of the top surface of the glass microoptic substrate. As a result of the beam propagating parallel to the top surface of the PIC die as it is expanding, the glass microoptic substrate can have a relatively low profile.

As used herein, the phrase "communicatively coupled" refers to the ability of a component to send a signal to or receive a signal from another component. The signal can be any type of signal, such as an input signal, an output signal, or a power signal. A component can send or receive a signal to another component to which it is communicatively coupled via a wired or wireless communication medium (e.g., conductive traces, conductive contacts, air). Examples of components that are communicatively coupled include integrated circuit dies located in the same package that communicate via an embedded bridge in a package substrate and an integrated circuit component attached to a printed circuit board that send signals to or receives signals from other integrated circuit components or electronic devices attached to the printed circuit board.

In the following description, specific details are set forth, but embodiments of the technologies described herein may be practiced without these specific details. Well-known circuits, structures, and techniques have not been shown in detail to avoid obscuring an understanding of this description. Phrases such as "an embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner. "Connected" may indicate elements are in direct physical or electrical contact, and "coupled" may indicate elements co-operate or interact, but they may or may not be in direct physical or electrical contact. Furthermore, the terms "comprising," "including," "having," and the like, as used with respect to embodiments of the present disclosure, are synonymous. Terms modified by the word "substantially" include arrangements, orientations, spacings, or positions that vary slightly from the meaning of the unmodified term. For example, the central axis of a magnetic plug that is substantially coaxially aligned with a through hole may be misaligned from a central axis of the through hole by several degrees. In another example, a substrate assembly feature, such as a through width, that is described as having substantially a listed dimension can vary within a few percent of the listed dimension.

It will be understood that in the examples shown and described further below, the figures may not be drawn to scale and may not include all possible layers and/or circuit components. In addition, it will be understood that although certain figures illustrate transistor designs with source/drain regions, electrodes, etc. having orthogonal (e.g., perpendicular) boundaries, embodiments herein may implement such boundaries in a substantially orthogonal manner (e.g., within +/−5 or 10 degrees of orthogonality) due to fabrication methods used to create such devices or for other reasons.

Reference is now made to the drawings, which are not necessarily drawn to scale, wherein similar or same numbers may be used to designate the same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives within the scope of the claims.

As used herein, the phrase "located on" in the context of a first layer or component located on a second layer or component refers to the first layer or component being directly physically attached to the second part or component (no layers or components between the first and second layers or components) or physically attached to the second layer or component with one or more intervening layers or components.

As used herein, the term "adjacent" refers to layers or components that are in physical contact with each other. That is, there is no layer or component between the stated adjacent layers or components. For example, a layer X that is adjacent to a layer Y refers to a layer that is in physical contact with layer Y.

Figure 2:
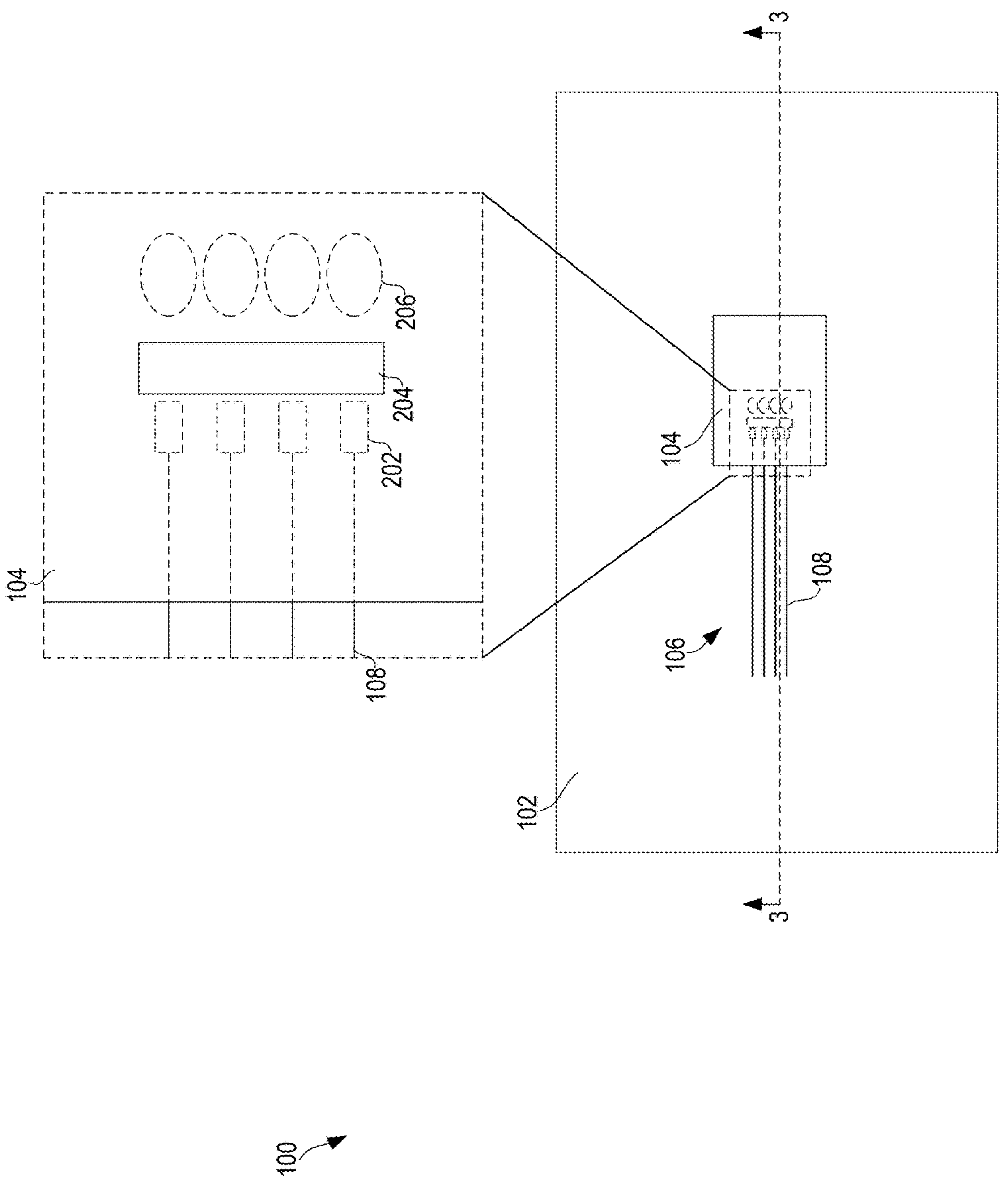
FIG. 2 is a top-down view of the system of FIG. 1.
Figure 3:
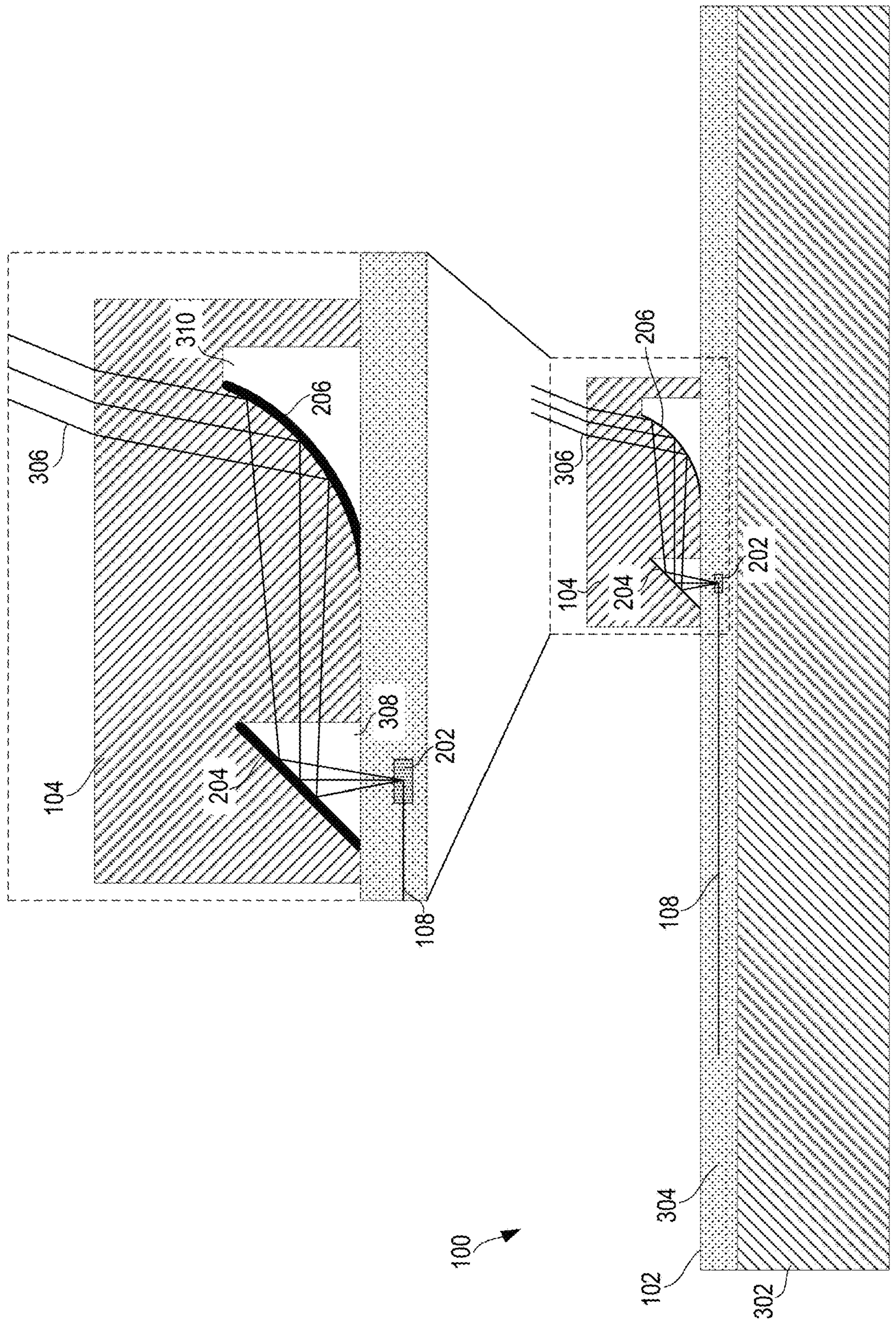
FIG. 3 is a cross-sectional view of one embodiment of the system of FIG. 1.

Referring now to FIGS. 1-3, in one embodiment, a system 100 includes a photonic integrated circuit die 102 with a glass microoptic substrate 104 mounted on it. FIG. 1 shows an isometric perspective view of the system 100, FIG. 2 shows a top-down view of the system 100, and FIG. 3 shows a cross-sectional view of one embodiment of the system 100.

An array 106 of optical waveguides 108 is defined in the PIC die 102. A waveguide 108 can transport light through the PIC die 102. Each of the waveguides 108 in the array 106 ends at a vertical coupler 202, which directs the beam out of the top surface of the PIC die 102. The vertical couplers 202 may be, e.g., grating couplers, integrated micromirrors, or other optical elements that reflect light from the waveguides 108 upward towards the top surface of the PIC die 102.

The glass microoptic substrate 104 is positioned over the vertical couplers 202. Light from the vertical couplers 202 is reflected off of one or more flat micromirrors 204 in the glass microoptic substrate 104. In the illustrative embodiment, the micromirrors 204 reflect the light so that each beam is parallel to the top surface of the PIC die 102.

Each beam can then expand as it propagates parallel to the top surface of the PIC die 102. Each beam reflects off of a curved micromirror defined in the microoptic glass substrate 104, focusing the light into collimated beam 306 that is directed out of the top surface of the glass microoptic substrate 104. It should be appreciated that, as the beams are propagating parallel to the top surface of the PIC die 102 as they expand, the thickness of the glass microoptic substrate 104 is not constrained by the distance required for the beams to expand to a desired size. Furthermore, in the illustrative embodiment, by using embedded micromirrors 204, 206 instead of microlenses, the optical surfaces of the mirrors 204, 206 are recessed below the outer surfaces of the substrate, and there is no requirement to use glass-air interfaces for refraction. Additionally, as the top and bottom surfaces in the illustrative embodiment of the glass microoptic substrate 104 can be planar, the glass microoptic substrate 104 is compatible with wafer scale fusion bonding.

The PIC die 102 is configured to generate, detect, and/or manipulate light. The PIC die 102 may include active or passive optical elements such as splitters, couplers, filters, optical amplifiers, lasers, photodetectors, modulators, etc. The waveguides 108 may be used to transmit light, receive light, or both. The PIC die 102 may include any suitable number of waveguides 108, such as 1-1,024 waveguides. The light in the waveguides 108 may be any suitable wavelength, such as 400-2,000 nanometers. In the illustrative embodiment, the light in the waveguides 108 is, e.g., 1,310 nanometers, 1,550 nanometers, or somewhere else in the range of 1,200-1,600 nanometers. The PIC die 102 may be made of any suitable material, such as silicon. In the illustrative embodiment, the waveguides 108 may be silicon waveguides embedded in silicon oxide cladding.

The PIC die 102 may be mounted on a substrate, such as a circuit board or electrical integrated circuit. The PIC die 102 may include electrical connections, which may act as data input and output, power connections, etc. The PIC die 102 may interface with one or more electrical integrated circuit (EIC) dies. The EIC dies may include any suitable electronic integrated circuit component, such as resistors, capacitors, inductors, transistors, etc. The EIC die may include any suitable analog and/or digital circuitry, such as a processor, a memory, an application-specific integrated circuit (ASIC), a field-programmable gate array (FPGA), etc. In some embodiments, the system 100 may be embodied as a router, a switch, a network interface controller, and/or the like. In such embodiments, the EIC die connected to the PIC die 102 may include network interface controller circuitry to process, parse, route, etc., network packets sent and received by the system 100. The PIC die 102 may send and receive network packets by optically modulating light and/or by receiving light.

The illustrative glass microoptic substrate 104 is silicon oxide glass. In other embodiments, the substrate 104 may be made of any suitable crystalline or non-crystalline material, such as fused silicon, borosilicate, sapphire, yttrium aluminum garnet, etc. The glass microoptic substrate 104 may have any suitable length or width, such as 10-500 millimeters. The glass microoptic substrate 104 may have any suitable thickness, such as 0.05-5 millimeters.

In the illustrative embodiment, the mirrors 206 direct the light out of the glass microoptic substrate 104 at a small angle relative to normal incidence. In other embodiments, the mirrors 206 may direct the light of the glass microoptic substrate 104 at any suitable angle. In some embodiments, polarization filtering could also be achieved by appropriate geometries to make use of Brewster angles of incidence on the reflecting surfaces. The mirror 206 may collimate the light to a beam 306 of any suitable mode field diameter, such as 20-500 micrometers, as measured at the $1/e^2$ width. The mirror 206 may have any suitable shape, such as an off-axis parabola, a toroidal surface, an aspherical surface, etc.

The mirrors 204, 206 may be made of any suitable material, such as a reflective metal such as aluminum, silver, gold, etc. In some embodiments, the mirrors 204, 206 may be made of a dielectric stack. In other embodiments, one or both of the mirrors 204, 206 may operate based on total internal reflection. In the illustrative embodiment and as discussed in more detail below, the shape of the mirrors 204, 206 may be formed by selective laser etching to form a cavity 308, 310 in the glass microoptic substrate 104. After the reflective surface of the mirrors 204, 206 is applied, in some embodiments, the cavities 308, 310 may be backfilled with any suitable material, allowing for planarization of the glass microoptic substrate 104. In the illustrative embodiment, the vertical couplers 202 direct the light out of the PIC die 102 at approximately normal incidence. In other embodiments, the vertical couplers 202 may direct the light of the PIC die 102 at any suitable angle.

Figure 4:
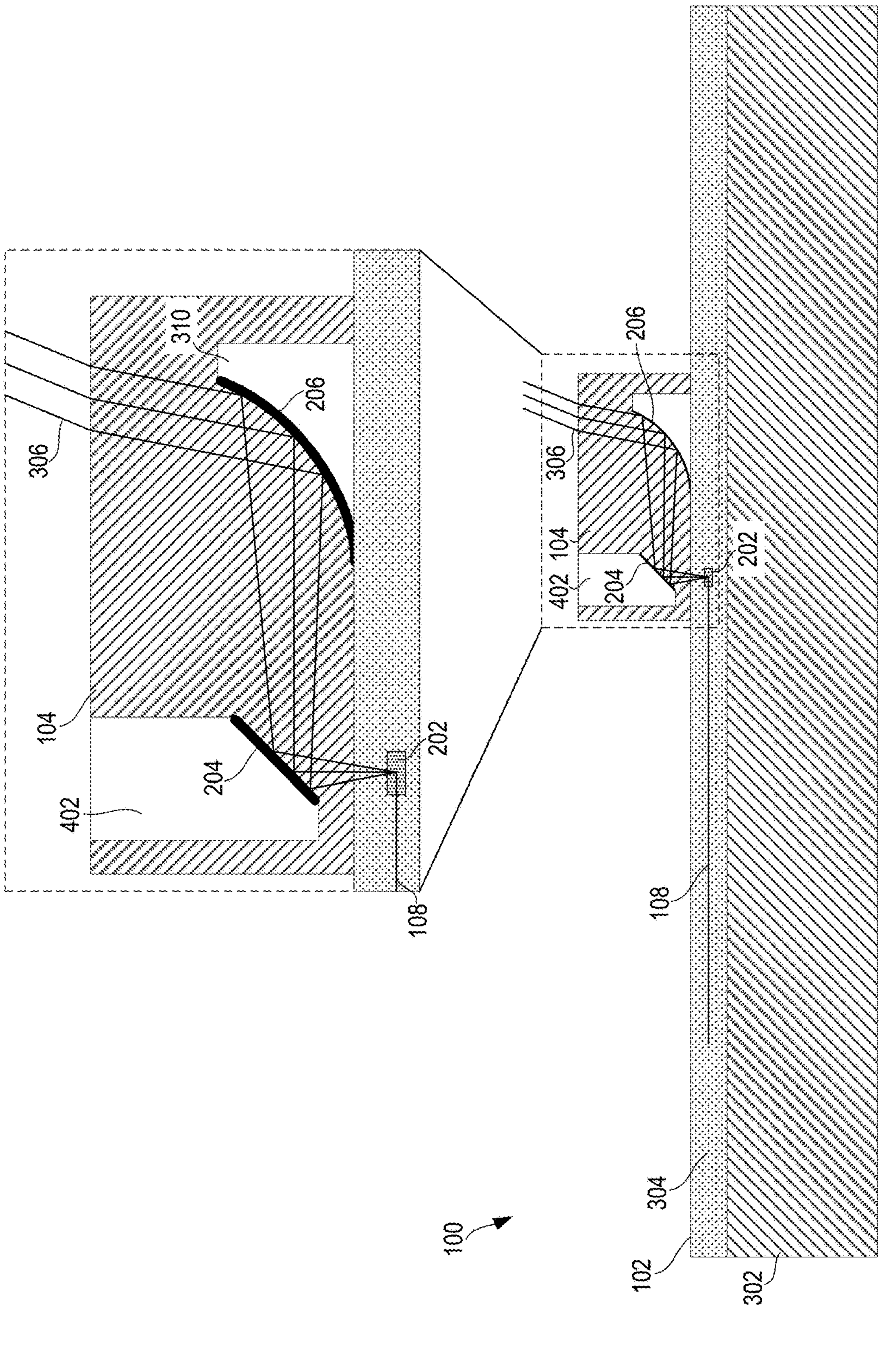
FIG. 4 is a cross-sectional view of one embodiment of the system of FIG. 1.

Referring now to FIG. 4, in one embodiment, the system 100 may include a glass microoptic substrate 104 with a mirror 204 that is positioned in a cavity 402 formed from the top surface of the glass microoptic substrate 104, rather than from the bottom surface of the glass microoptic substrate 104, as shown in FIG. 3. In some embodiments, the mirror 204 may operate based on total internal reflection.

Figure 5:
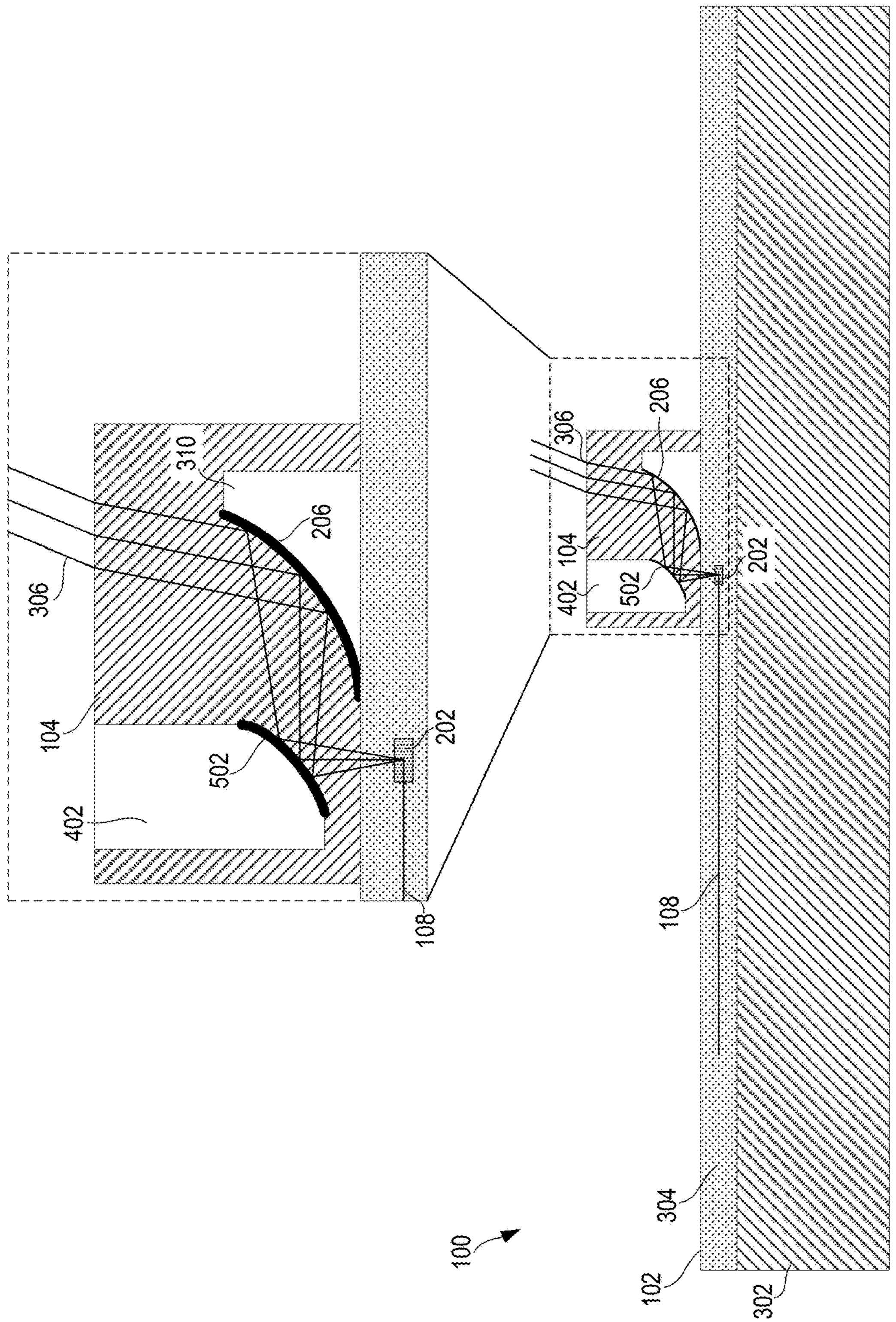
FIG. 5 is a cross-sectional view of one embodiment of the system of FIG. 1.

Referring now to FIG. 5, in one embodiment, the system 100 may include a glass microoptic substrate 104 with one or more curved mirrors 502 that reflect light from the vertical couplers 202 in place of the flat mirror 204. The curved mirrors 502 are convex, causing the light from the vertical couplers 202 to diverge more quickly, allowing the light to reach a particular mode field diameter (e.g., 25-100 micrometers) in a shorter distance, allowing the glass microoptic substrate 104 to be smaller. The mirror 206 may the focus the light into collimated beams 306.

It should be appreciated that the glass microoptic substrate 104 disclosed herein can be used in additional configurations and for additional purposes. For example, the mirrors in the glass microoptic substrate 104 can be used to shape the beam profile, which can be used as aberration compensation or pre-compensation, Bessel beam generation, flat-top beam formation, etc. Such beam shaping could allow for improved free-space propagation of beams such as sensing applications, LIDAR, biological sensing, 3D shape sensing, and other free-space optical applications.

Figure 6:
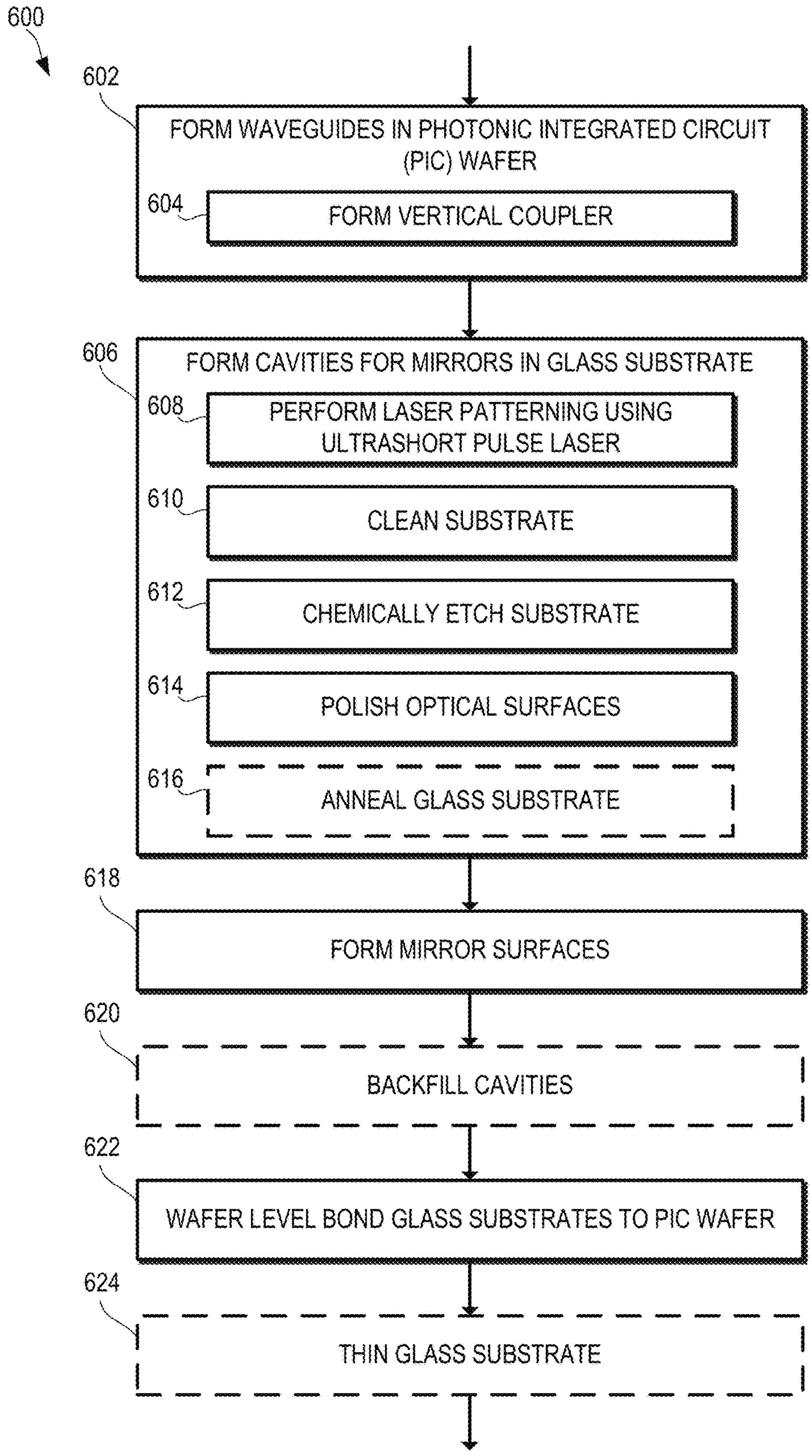
FIG. 6 is a simplified flow diagram of at least one embodiment of a method for manufacturing a system including a PIC die with a glass microoptic substrate mounted on it.

Referring now to FIG. 6, in one embodiment, a flowchart for a method 600 for creating the system 100 with a PIC die 102 and glass microoptic substrate 104 is shown. The method 600 may be executed by a technician and/or by one or more automated machines. In some embodiments, one or more machines may be programmed to do some or all of the steps of the method 600. Such a machine may include, e.g., a memory, a processor, data storage, etc. The memory and/or data storage may store instructions that, when executed by the machine, causes the machine to perform some or all of the steps of the method 600. The method 600 may use any suitable set of techniques that are used in semiconductor processing, such as chemical vapor deposition, atomic layer deposition, physical layer deposition, molecular beam epitaxy, layer transfer, photolithography, ion implantation, dry etching, wet etching, selective laser etching, thermal treatments, flip chip, layer transfer, magnetron sputter deposition, pulsed laser deposition, etc. It should be appreciated that the method 600 is merely one embodiment of a method to create one embodiment of the system 100, and other methods may be used to create any suitable embodiment of the system 100. In some embodiments, steps of the method 600 may be performed in a different order than that shown in the flowchart.

Figure 7:
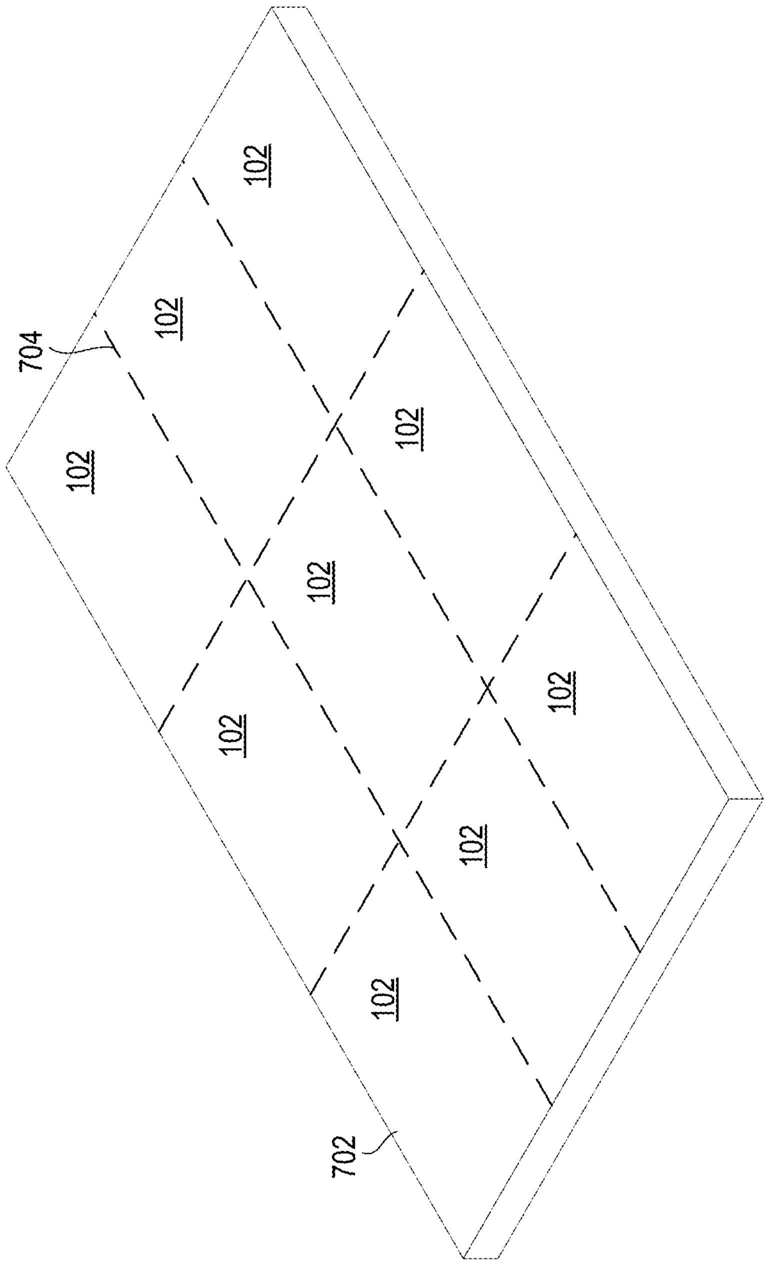
FIG. 7 is an isometric view of a PIC wafer at one stage of the method of the flow diagram of FIG. 6.
Figure 8:
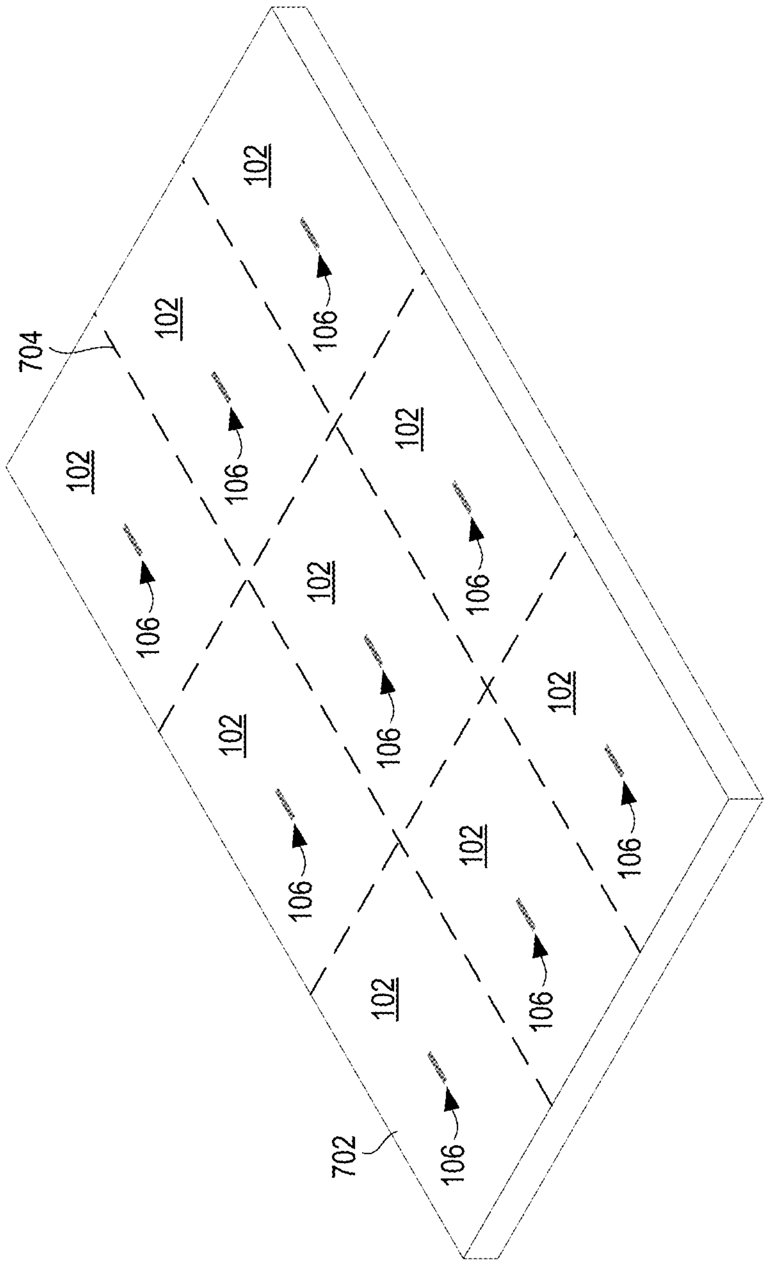
FIG. 8 is an isometric view of a PIC wafer at one stage of the method of the flow diagram of FIG. 6.

The method 600 begins in block 602, in which one or more waveguides 108 are formed in a PIC wafer 702. A blank PIC wafer 702 is shown in FIG. 7, with lines 704 indicating where the PIC wafer 702 will be cut to be singulated into PIC dies 102. A PIC wafer 702 with an array 106 waveguides 108 is shown in FIG. 8. Vertical couplers 202 may be formed in block 604. It should be appreciated that the PIC wafer 702 may include additional features besides the array 106 of waveguides 108 and the vertical couplers 202, including active or passive optical elements such as splitters, couplers, filters, optical amplifiers, lasers, photodetectors, modulators, etc., as well as any electrical connections for input and output signals, power, etc.

In block 606, one or more cavities (such as cavities 308, 310, 402) are formed in the glass microoptic substrate 104 for mirrors (such as mirrors 204, 206, 502). The cavities may be formed from the top surface, bottom surface, or side surfaces of the glass microoptic substrate 104, as appropriate. In the illustrative embodiment, in block 608, laser patterning is performed using an ultrashort pulse laser, such as a femtosecond laser. An ultrashort pulse laser is used to increase the susceptibility of part of the glass microoptic substrate 104 to etching.

In block 610, the glass microoptic substrate 104 is cleaned after laser patterning. In block 612, the glass microoptic substrate 104 is chemically wet etched, such as by using hydrofluoric acid as an etchant to etch away the patterned portion of the glass substrate 104. In block 614, optical surfaces of the glass microoptic substrate 104 are polished, such as by using a $CO_2$ laser or flame polishing to polish the optical surfaces. Optionally, in some embodiments, the glass microoptic substrate 104 may be annealed in block 616 to improve the optical surfaces.

In block 618, a reflective material such as silver, aluminum, or gold may be applied in the cavities (such as cavities 308, 310, 402), or a reflective dielectric stack may be applied. The reflective material or reflective dielectric stack may form the mirrors 204, 206, 502. In some embodiments, some of the mirrors may operate based on total internal reflection, and a separate reflective surface may not need to be added. Optionally, in block 620, in some embodiments, the cavities (such as cavities 308, 310, 402) may then be backfilled with any suitable material, allowing for planarization of the glass microoptic substrate 104.

Figure 9:
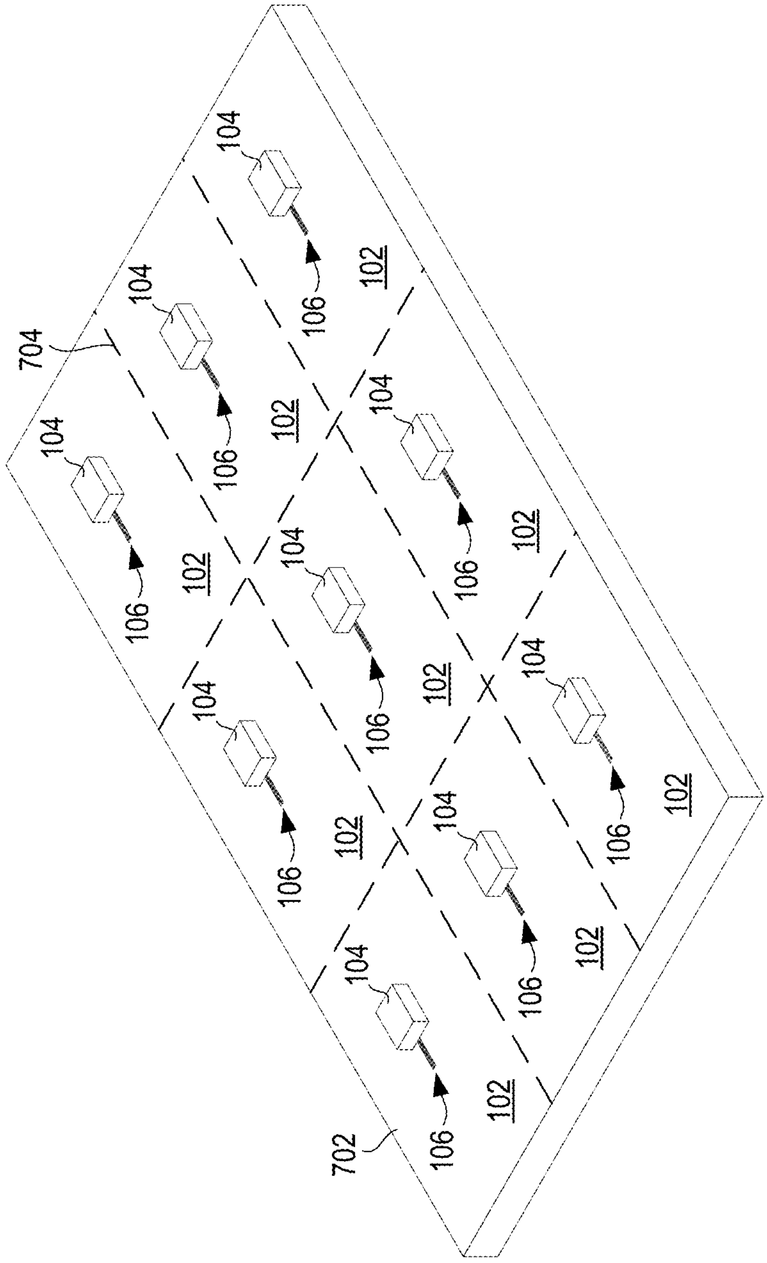
FIG. 9 is an isometric view of a PIC wafer at one stage of the method of the flow diagram of FIG. 6.

In block 622, the glass microoptic substrates 104 may be bonded to the PIC wafer 702 at the wafer level, as shown in FIG. 9. In the illustrative embodiment, the glass microoptic substrates 104 are positioned using pick and place. In some embodiments, a wafer-size structure of several of glass microoptic substrates 104 may be positioned over the wafer 702. The glass microoptic substrate 104 may be secured to the wafer 702, such as using an adhesive. In some embodiments, the microoptic substrate 104 may be bonded to the wafer 702 using fusion bonding.

Figure 10:
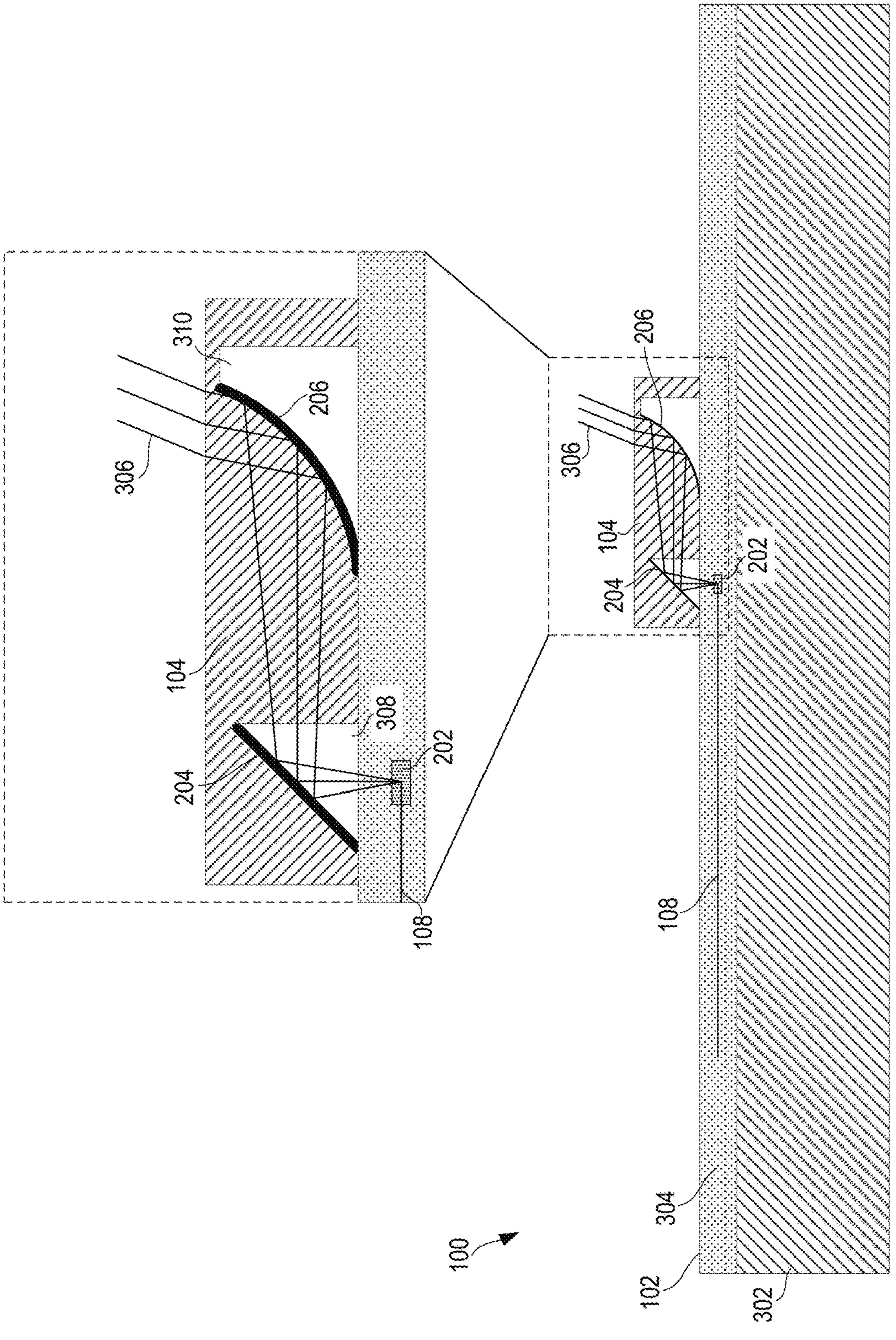
FIG. 10 is a cross-sectional view of a PIC wafer at one stage of the method of the flow diagram of FIG. 6.

In block 624, in some embodiments, the glass microoptic substrate 104 may be thinned after it is attached to the wafer 702, resulting in a lower-profile structure, as shown in FIG. 10. The glass microoptic substrate 104 may be thinned to a height of, e.g., 50-500 micrometers thick. The wafer 702 may then be singulated, resulting in the system 100 shown in FIGS. 1-3.

Figure 11:
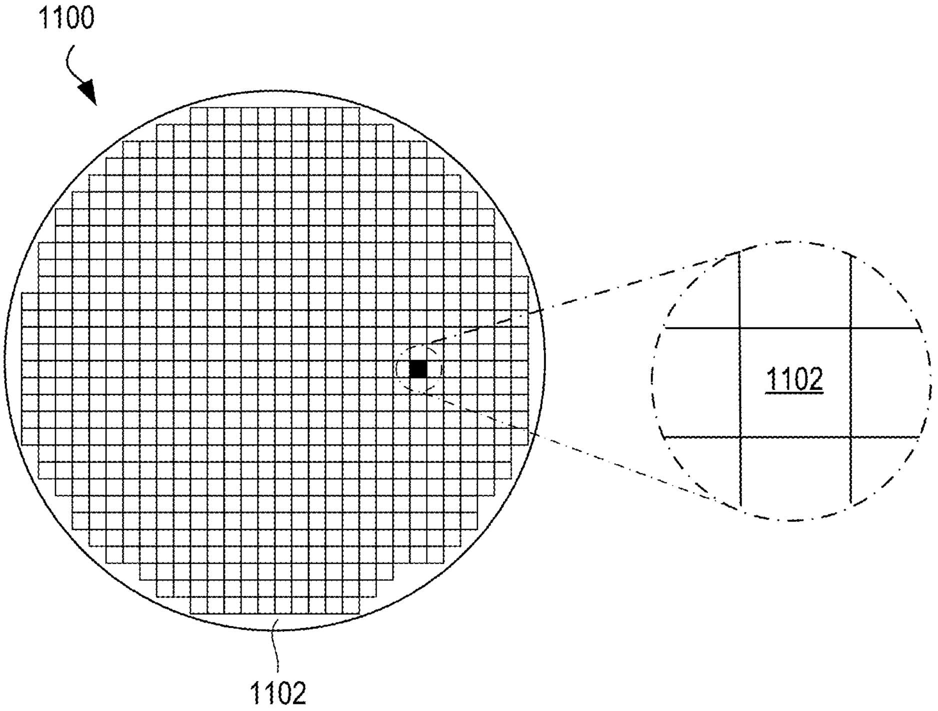
FIG. 11 is a top view of a wafer and dies that may be included in a microelectronic assembly, in accordance with any of the embodiments disclosed herein.

FIG. 11 is a top view of a wafer 1100 and dies 1102 that may be included in any of the systems 100 disclosed herein (e.g., as any suitable ones of the PIC dies 102). The wafer 1100 may be composed of semiconductor material and may include one or more dies 1102 having integrated circuit structures formed on a surface of the wafer 1100. The individual dies 1102 may be a repeating unit of an integrated circuit product that includes any suitable integrated circuit. After the fabrication of the semiconductor product is complete, the wafer 1100 may undergo a singulation process in which the dies 1102 are separated from one another to provide discrete "chips" of the integrated circuit product. The die 1102 may be any of the dies 102 disclosed herein. The die 1102 may include one or more transistors (e.g., some of the transistors 1240 of FIG. 12, discussed below), supporting circuitry to route electrical signals to the transistors, passive components (e.g., signal traces, resistors, capacitors, or inductors), and/or any other integrated circuit components. In some embodiments, the wafer 1100 or the die 1102 may include a memory device (e.g., a random access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 1102. For example, a memory array formed by multiple memory devices may be formed on a same die 1102 as a processor unit (e.g., the processor unit 1502 of FIG. 15) or other logic that is configured to store information in the memory devices or execute instructions stored in the memory array. Various ones of the systems 100 disclosed herein may be manufactured using a die-to-wafer assembly technique in which some dies 102 are attached to a wafer 1100 that include others of the dies 102, and the wafer 1100 is subsequently singulated.

Figure 12:
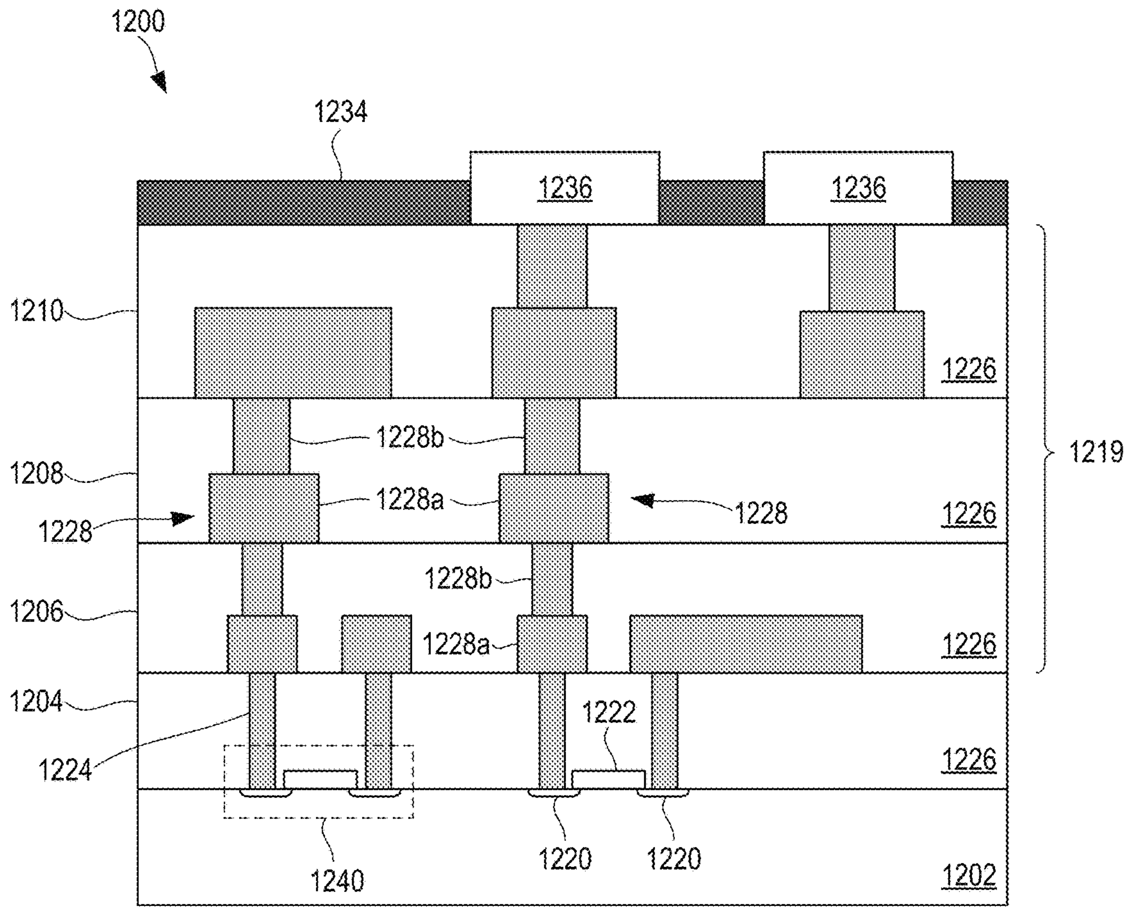
FIG. 12 is a cross-sectional side view of an integrated circuit device that may be included in a microelectronic assembly, in accordance with any of the embodiments disclosed herein.

FIG. 12 is a cross-sectional side view of an integrated circuit device 1200 that may be included in any of the systems 100 disclosed herein. One or more of the integrated circuit devices 1200 may be included in one or more dies 1102 (FIG. 11). The integrated circuit device 1200 may be formed on a die substrate 1202 (e.g., the wafer 1100 of FIG. 11) and may be included in a die (e.g., the die 1102 of FIG. 11). The die substrate 1202 may be a semiconductor substrate composed of semiconductor material systems including, for example, n-type or p-type materials systems (or a combination of both). The die substrate 1202 may include, for example, a crystalline substrate formed using a bulk silicon or a silicon-on-insulator (SOI) substructure. In some embodiments, the die substrate 1202 may be formed using alternative materials, which may or may not be combined with silicon, that include, but are not limited to, germanium, indium antimonide, lead telluride, indium arsenide, indium phosphide, gallium arsenide, or gallium antimonide. Further materials classified as group II-VI, III-V, or IV may also be used to form the die substrate 1202. Although a few examples of materials from which the die substrate 1202 may be formed are described here, any material that may serve as a foundation for an integrated circuit device 1200 may be used. The die substrate 1202 may be part of a singulated die (e.g., the dies 1102 of FIG. 11) or a wafer (e.g., the wafer 1100 of FIG. 11).

The integrated circuit device 1200 may include one or more device layers 1204 disposed on the die substrate 1202. The device layer 1204 may include features of one or more transistors 1240 (e.g., metal oxide semiconductor field-effect transistors (MOSFETs)) formed on the die substrate 1202. The transistors 1240 may include, for example, one or more source and/or drain (S/D) regions 1220, a gate 1222 to control current flow between the S/D regions 1220, and one or more S/D contacts 1224 to route electrical signals to/from the S/D regions 1220. The transistors 1240 may include additional features not depicted for the sake of clarity, such as device isolation regions, gate contacts, and the like. The transistors 1240 are not limited to the type and configuration depicted in FIG. 12 and may include a wide variety of other types and configurations such as, for example, planar transistors, non-planar transistors, or a combination of both. Non-planar transistors may include FinFET transistors, such as double-gate transistors or tri-gate transistors, and wrap-around or all-around gate transistors, such as nanoribbon, nanosheet, or nanowire transistors.

FIGS. 13A-13D are simplified perspective views of example planar, FinFET, gate-all-around, and stacked gate-all-around transistors. The transistors illustrated in FIGS. 13A-13D are formed on a substrate 1316 having a surface 1308. Isolation regions 1314 separate the source and drain regions of the transistors from other transistors and from a bulk region 1318 of the substrate 1316.

Figure 13A:
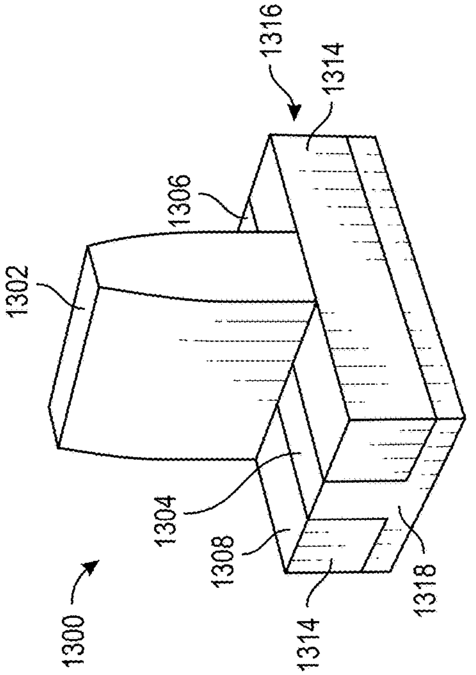
FIGS. 13A-13D are perspective views of example planar, gate-all-around, and stacked gate-all-around transistors.

FIG. 13A is a perspective view of an example planar transistor 1300 comprising a gate 1302 that controls current flow between a source region 1304 and a drain region 1306. The transistor 1300 is planar in that the source region 1304 and the drain region 1306 are planar with respect to the substrate surface 1308.

Figure 13B:
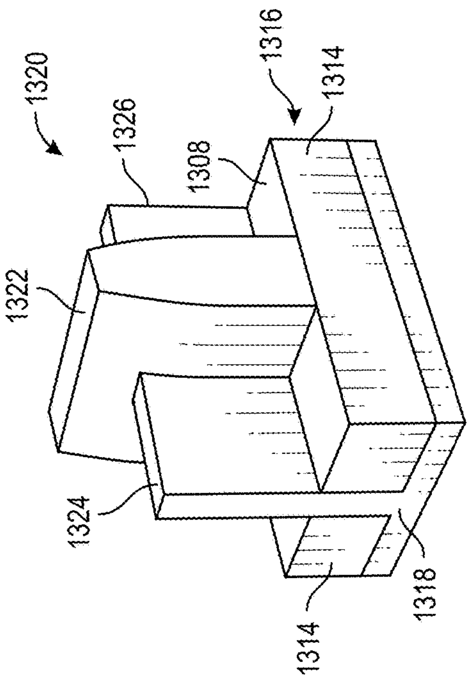

FIG. 13B is a perspective view of an example FinFET transistor 1320 comprising a gate 1322 that controls current flow between a source region 1324 and a drain region 1326. The transistor 1320 is non-planar in that the source region 1324 and the drain region 1326 comprise "fins" that extend upwards from the substrate surface 1328. As the gate 1322 encompasses three sides of the semiconductor fin that extends from the source region 1324 to the drain region 1326, the transistor 1320 can be considered a tri-gate transistor. FIG. 13B illustrates one S/D fin extending through the gate 1322, but multiple S/D fins can extend through the gate of a FinFET transistor.

Figure 13C:
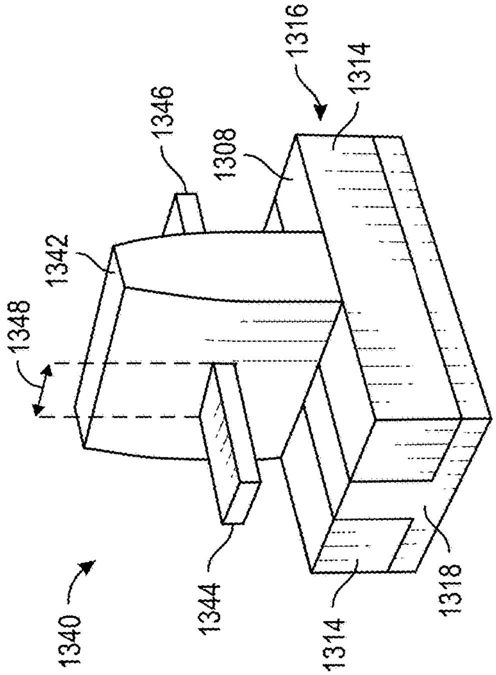

FIG. 13C is a perspective view of a gate-all-around (GAA) transistor 1340 comprising a gate 1342 that controls current flow between a source region 1344 and a drain region 1346. The transistor 1340 is non-planar in that the source region 1344 and the drain region 1346 are elevated from the substrate surface 1328.

Figure 13D:
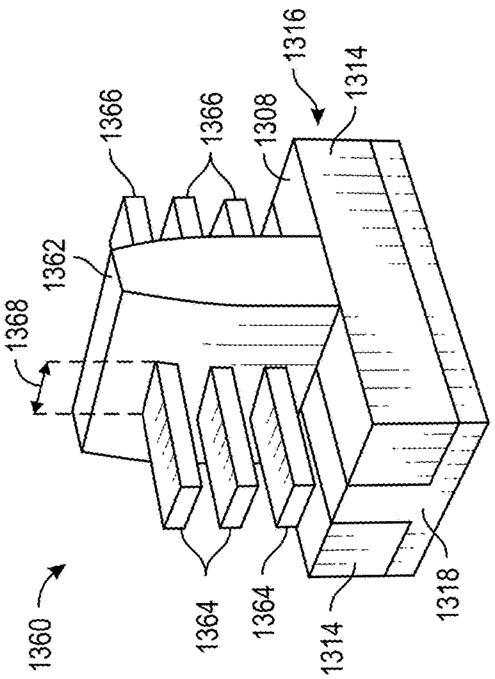

FIG. 13D is a perspective view of a GAA transistor 1360 comprising a gate 1362 that controls current flow between multiple elevated source regions 1364 and multiple elevated drain regions 1366. The transistor 1360 is a stacked GAA transistor as the gate controls the flow of current between multiple elevated S/D regions stacked on top of each other. The transistors 1340 and 1360 are considered gate-all-around transistors as the gates encompass all sides of the semiconductor portions that extends from the source regions to the drain regions. The transistors 1340 and 1360 can alternatively be referred to as nanowire, nanosheet, or nanoribbon transistors depending on the width (e.g., widths 1348 and 1368 of transistors 1340 and 1360, respectively) of the semiconductor portions extending through the gate.

Returning to FIG. 12, a transistor 1240 may include a gate 1222 formed of at least two layers, a gate dielectric and a gate electrode. The gate dielectric may include one layer or a stack of layers. The one or more layers may include silicon oxide, silicon dioxide, silicon carbide, and/or a high-k dielectric material.

The high-k dielectric material may include elements such as hafnium, silicon, oxygen, titanium, tantalum, lanthanum, aluminum, zirconium, barium, strontium, yttrium, lead, scandium, niobium, and zinc. Examples of high-k materials that may be used in the gate dielectric include, but are not limited to, hafnium oxide, hafnium silicon oxide, lanthanum oxide, lanthanum aluminum oxide, zirconium oxide, zirconium silicon oxide, tantalum oxide, titanium oxide, barium strontium titanium oxide, barium titanium oxide, strontium titanium oxide, yttrium oxide, aluminum oxide, lead scandium tantalum oxide, and lead zinc niobate. In some embodiments, an annealing process may be carried out on the gate dielectric to improve its quality when a high-k material is used.

The gate electrode may be formed on the gate dielectric and may include at least one p-type work function metal or n-type work function metal, depending on whether the transistor 1240 is to be a p-type metal oxide semiconductor (PMOS) or an n-type metal oxide semiconductor (NMOS) transistor. In some implementations, the gate electrode may consist of a stack of two or more metal layers, where one or more metal layers are work function metal layers and at least one metal layer is a fill metal layer. Further metal layers may be included for other purposes, such as a barrier layer.

For a PMOS transistor, metals that may be used for the gate electrode include, but are not limited to, ruthenium, palladium, platinum, cobalt, nickel, conductive metal oxides (e.g., ruthenium oxide), and any of the metals discussed below with reference to an NMOS transistor (e.g., for work function tuning). For an NMOS transistor, metals that may be used for the gate electrode include, but are not limited to, hafnium, zirconium, titanium, tantalum, aluminum, alloys of these metals, carbides of these metals (e.g., hafnium carbide, zirconium carbide, titanium carbide, tantalum carbide, and aluminum carbide), and any of the metals discussed above with reference to a PMOS transistor (e.g., for work function tuning).

In some embodiments, when viewed as a cross-section of the transistor 1240 along the source-channel-drain direction, the gate electrode may consist of a U-shaped structure that includes a bottom portion substantially parallel to the surface of the die substrate 1202 and two sidewall portions that are substantially perpendicular to the top surface of the die substrate 1202. In other embodiments, at least one of the metal layers that form the gate electrode may simply be a planar layer that is substantially parallel to the top surface of the die substrate 1202 and does not include sidewall portions substantially perpendicular to the top surface of the die substrate 1202. In other embodiments, the gate electrode may consist of a combination of U-shaped structures and planar, non-U-shaped structures. For example, the gate electrode may consist of one or more U-shaped metal layers formed atop one or more planar, non-U-shaped layers.

In some embodiments, a pair of sidewall spacers may be formed on opposing sides of the gate stack to bracket the gate stack. The sidewall spacers may be formed from materials such as silicon nitride, silicon oxide, silicon carbide, silicon nitride doped with carbon, and silicon oxynitride. Processes for forming sidewall spacers are well known in the art and generally include deposition and etching process steps. In some embodiments, a plurality of spacer pairs may be used; for instance, two pairs, three pairs, or four pairs of sidewall spacers may be formed on opposing sides of the gate stack.

The S/D regions 1220 may be formed within the die substrate 1202 adjacent to the gate 1222 of individual transistors 1240. The S/D regions 1220 may be formed using an implantation/diffusion process or an etching/deposition process, for example. In the former process, dopants such as boron, aluminum, antimony, phosphorous, or arsenic may be ion-implanted into the die substrate 1202 to form the S/D regions 1220. An annealing process that activates the dopants and causes them to diffuse farther into the die substrate 1202 may follow the ion-implantation process. In the latter process, the die substrate 1202 may first be etched to form recesses at the locations of the S/D regions 1220. An epitaxial deposition process may then be carried out to fill the recesses with material that is used to fabricate the S/D regions 1220. In some implementations, the S/D regions 1220 may be fabricated using a silicon alloy such as silicon germanium or silicon carbide. In some embodiments, the epitaxially deposited silicon alloy may be doped in situ with dopants such as boron, arsenic, or phosphorous. In some embodiments, the S/D regions 1220 may be formed using one or more alternate semiconductor materials such as germanium or a group III-V material or alloy. In further embodiments, one or more layers of metal and/or metal alloys may be used to form the S/D regions 1220.

Electrical signals, such as power and/or input/output (I/O) signals, may be routed to and/or from the devices (e.g., transistors 1240) of the device layer 1204 through one or more interconnect layers disposed on the device layer 1204 (illustrated in FIG. 12 as interconnect layers 1206-1210). For example, electrically conductive features of the device layer 1204 (e.g., the gate 1222 and the S/D contacts 1224) may be electrically coupled with the interconnect structures 1228 of the interconnect layers 1206-1210. The one or more interconnect layers 1206-1210 may form a metallization stack (also referred to as an "ILD stack") 1219 of the integrated circuit device 1200.

The interconnect structures 1228 may be arranged within the interconnect layers 1206-1210 to route electrical signals according to a wide variety of designs; in particular, the arrangement is not limited to the particular configuration of interconnect structures 1228 depicted in FIG. 12. Although a particular number of interconnect layers 1206-1210 is depicted in FIG. 12, embodiments of the present disclosure include integrated circuit devices having more or fewer interconnect layers than depicted.

In some embodiments, the interconnect structures 1228 may include lines **1228*a* and/or vias 1228*b* filled with an electrically conductive material such as a metal. The lines 1228*a* may be arranged to route electrical signals in a direction of a plane that is substantially parallel with a surface of the die substrate 1202 upon which the device layer 1204 is formed. For example, the lines 1228*a* may route electrical signals in a direction in and out of the page and/or in a direction across the page. The vias 1228*b* may be arranged to route electrical signals in a direction of a plane that is substantially perpendicular to the surface of the die substrate 1202 upon which the device layer 1204 is formed. In some embodiments, the vias 1228*b* may electrically couple lines 1228*a* of different interconnect layers 1206-1210** together.

The interconnect layers 1206-1210 may include a dielectric material 1226 disposed between the interconnect structures 1228, as shown in FIG. 12. In some embodiments, dielectric material 1226 disposed between the interconnect structures 1228 in different ones of the interconnect layers 1206-1210 may have different compositions; in other embodiments, the composition of the dielectric material 1226 between different interconnect layers 1206-1210 may be the same. The device layer 1204 may include a dielectric material 1226 disposed between the transistors 1240 and a bottom layer of the metallization stack as well. The dielectric material 1226 included in the device layer 1204 may have a different composition than the dielectric material 1226 included in the interconnect layers 1206-1210; in other embodiments, the composition of the dielectric material 1226 in the device layer 1204 may be the same as a dielectric material 1226 included in any one of the interconnect layers 1206-1210.

A first interconnect layer 1206 (referred to as Metal 1 or "M1") may be formed directly on the device layer 1204. In some embodiments, the first interconnect layer 1206 may include lines **1228*a* and/or vias 1228*b*, as shown. The lines 1228*a* of the first interconnect layer 1206 may be coupled with contacts (e.g., the S/D contacts 1224) of the device layer 1204. The vias 1228*b* of the first interconnect layer 1206 may be coupled with the lines 1228*a* of a second interconnect layer 1208**.

The second interconnect layer 1208 (referred to as Metal 2 or "M2") may be formed directly on the first interconnect layer 1206. In some embodiments, the second interconnect layer 1208 may include via 1228*b* to couple the lines 1228 of the second interconnect layer 1208 with the lines 1228*a* of a third interconnect layer 1210. Although the lines 1228*a* and the vias 1228*b* are structurally delineated with a line within individual interconnect layers for the sake of clarity, the lines 1228*a* and the vias 1228*b* may be structurally and/or materially contiguous (e.g., simultaneously filled during a dual-damascene process) in some embodiments.

The third interconnect layer 1210 (referred to as Metal 3 or "M3") (and additional interconnect layers, as desired) may be formed in succession on the second interconnect layer 1208 according to similar techniques and configurations described in connection with the second interconnect layer 1208 or the first interconnect layer 1206. In some embodiments, the interconnect layers that are "higher up" in the metallization stack 1219 in the integrated circuit device 1200 (i.e., farther away from the device layer 1204) may be thicker that the interconnect layers that are lower in the metallization stack 1219, with lines 1228*a* and vias 1228*b* in the higher interconnect layers being thicker than those in the lower interconnect layers.

The integrated circuit device 1200 may include a solder resist material 1234 (e.g., polyimide or similar material) and one or more conductive contacts 1236 formed on the interconnect layers 1206-1210. In FIG. 12, the conductive contacts 1236 are illustrated as taking the form of bond pads. The conductive contacts 1236 may be electrically coupled with the interconnect structures 1228 and configured to route the electrical signals of the transistor(s) 1240 to external devices. For example, solder bonds may be formed on the one or more conductive contacts 1236 to mechanically and/or electrically couple an integrated circuit die including the integrated circuit device 1200 with another component (e.g., a printed circuit board). The integrated circuit device 1200 may include additional or alternate structures to route the electrical signals from the interconnect layers 1206-1210; for example, the conductive contacts 1236 may include other analogous features (e.g., posts) that route the electrical signals to external components.

In some embodiments in which the integrated circuit device 1200 is a double-sided die, the integrated circuit device 1200 may include another metallization stack (not shown) on the opposite side of the device layer(s) 1204. This metallization stack may include multiple interconnect layers as discussed above with reference to the interconnect layers 1206-1210, to provide conductive pathways (e.g., including conductive lines and vias) between the device layer(s) 1204 and additional conductive contacts (not shown) on the opposite side of the integrated circuit device 1200 from the conductive contacts 1236.

In other embodiments in which the integrated circuit device 1200 is a double-sided die, the integrated circuit device 1200 may include one or more through silicon vias (TSVs) through the die substrate 1202; these TSVs may make contact with the device layer(s) 1204, and may provide conductive pathways between the device layer(s) 1204 and additional conductive contacts (not shown) on the opposite side of the integrated circuit device 1200 from the conductive contacts 1236. In some embodiments, TSVs extending through the substrate can be used for routing power and ground signals from conductive contacts on the opposite side of the integrated circuit device 1200 from the conductive contacts 1236 to the transistors 1240 and any other components integrated into the die 1200, and the metallization stack 1219 can be used to route I/O signals from the conductive contacts 1236 to transistors 1240 and any other components integrated into the die 1200.

Multiple integrated circuit devices 1200 may be stacked with one or more TSVs in the individual stacked devices providing connection between one of the devices to any of the other devices in the stack. For example, one or more high-bandwidth memory (HBM) integrated circuit dies can be stacked on top of a base integrated circuit die and TSVs in the HBM dies can provide connection between the individual HBM and the base integrated circuit die. Conductive contacts can provide additional connections between adjacent integrated circuit dies in the stack. In some embodiments, the conductive contacts can be fine-pitch solder bumps (microbumps).

Figure 14:
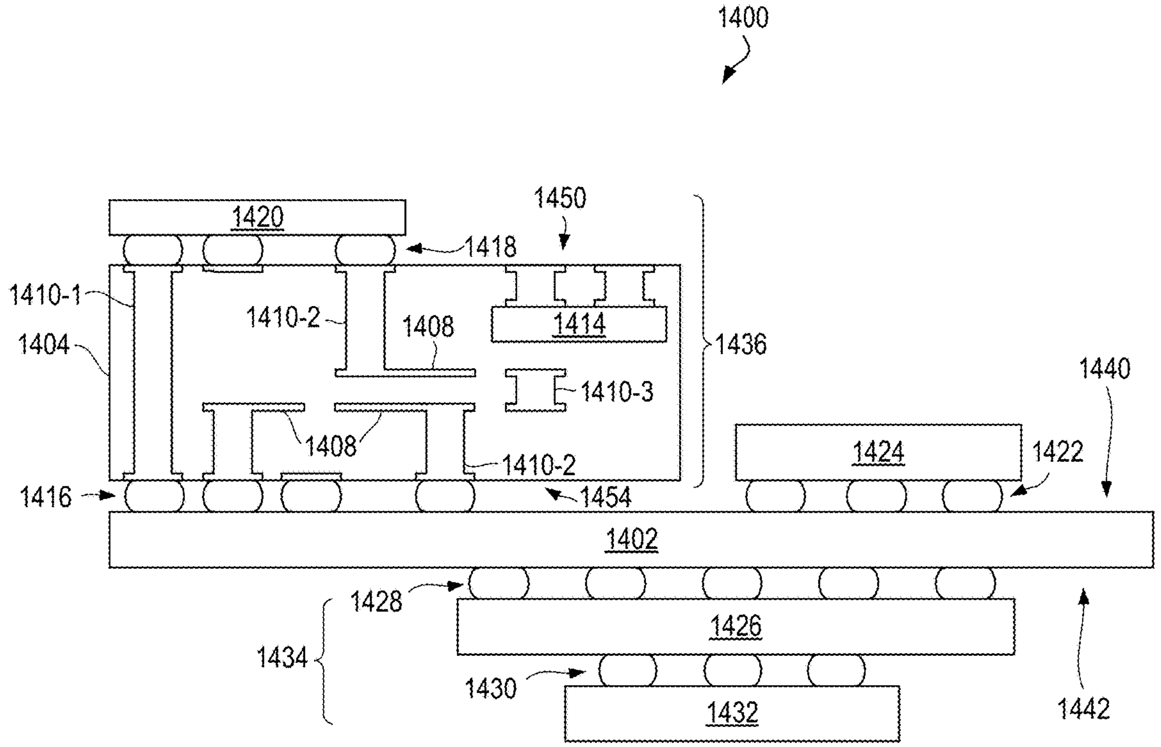
FIG. 14 is a cross-sectional side view of an integrated circuit device assembly that may include a microelectronic assembly, in accordance with any of the embodiments disclosed herein.

FIG. 14 is a cross-sectional side view of an integrated circuit device assembly 1400 that may be included in any of the systems 100 disclosed herein. The integrated circuit device assembly 1400 includes a number of components disposed on a circuit board 1402 (which may be a motherboard, system board, mainboard, etc.). The integrated circuit device assembly 1400 includes components disposed on a first face 1440 of the circuit board 1402 and an opposing second face 1442 of the circuit board 1402; generally, components may be disposed on one or both faces 1440 and 1442. Any of the integrated circuit components discussed below with reference to the integrated circuit device assembly 1400 may take the form of any suitable ones of the embodiments of the systems 100 disclosed herein.

In some embodiments, the circuit board 1402 may be a printed circuit board (PCB) including multiple metal (or interconnect) layers separated from one another by layers of dielectric material and interconnected by electrically conductive vias. The individual metal layers comprise conductive traces. Any one or more of the metal layers may be formed in a desired circuit pattern to route electrical signals (optionally in conjunction with other metal layers) between the components coupled to the circuit board 1402. In other embodiments, the circuit board 1402 may be a non-PCB substrate. The integrated circuit device assembly 1400 illustrated in FIG. 14 includes a package-on-interposer structure 1436 coupled to the first face 1440 of the circuit board 1402 by coupling components 1416. The coupling components 1416 may electrically and mechanically couple the package-on-interposer structure 1436 to the circuit board 1402, and may include solder balls (as shown in FIG. 14), pins (e.g., as part of a pin grid array (PGA), contacts (e.g., as part of a land grid array (LGA)), male and female portions of a socket, an adhesive, an underfill material, and/or any other suitable electrical and/or mechanical coupling structure.

The package-on-interposer structure 1436 may include an integrated circuit component 1420 coupled to an interposer 1404 by coupling components 1418. The coupling components 1418 may take any suitable form for the application, such as the forms discussed above with reference to the coupling components 1416. Although a single integrated circuit component 1420 is shown in FIG. 14, multiple integrated circuit components may be coupled to the interposer 1404; indeed, additional interposers may be coupled to the interposer 1404. The interposer 1404 may provide an intervening substrate used to bridge the circuit board 1402 and the integrated circuit component 1420.

The integrated circuit component 1420 may be a packaged or unpacked integrated circuit product that includes one or more integrated circuit dies (e.g., the die 1102 of FIG. 11, the integrated circuit device 1200 of FIG. 12) and/or one or more other suitable components. A packaged integrated circuit component comprises one or more integrated circuit dies mounted on a package substrate with the integrated circuit dies and package substrate encapsulated in a casing material, such as a metal, plastic, glass, or ceramic. In one example of an unpackaged integrated circuit component 1420, a single monolithic integrated circuit die comprises solder bumps attached to contacts on the die. The solder bumps allow the die to be directly attached to the interposer 1404. The integrated circuit component 1420 can comprise one or more computing system components, such as one or more processor units (e.g., system-on-a-chip (SoC), processor core, graphics processor unit (GPU), accelerator, chipset processor), I/O controller, memory, or network interface controller. In some embodiments, the integrated circuit component 1420 can comprise one or more additional active or passive devices such as capacitors, decoupling capacitors, resistors, inductors, fuses, diodes, transformers, sensors, electrostatic discharge (ESD) devices, and memory devices.

In embodiments where the integrated circuit component 1420 comprises multiple integrated circuit dies, they dies can be of the same type (a homogeneous multi-die integrated circuit component) or of two or more different types (a heterogeneous multi-die integrated circuit component). A multi-die integrated circuit component can be referred to as a multi-chip package (MCP) or multi-chip module (MCM).

In addition to comprising one or more processor units, the integrated circuit component 1420 can comprise additional components, such as embedded DRAM, stacked high bandwidth memory (HBM), shared cache memories, input/output (I/O) controllers, or memory controllers. Any of these additional components can be located on the same integrated circuit die as a processor unit, or on one or more integrated circuit dies separate from the integrated circuit dies comprising the processor units. These separate integrated circuit dies can be referred to as "chiplets". In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Generally, the interposer 1404 may spread connections to a wider pitch or reroute a connection to a different connection. For example, the interposer 1404 may couple the integrated circuit component 1420 to a set of ball grid array (BGA) conductive contacts of the coupling components 1416 for coupling to the circuit board 1402. In the embodiment illustrated in FIG. 14, the integrated circuit component 1420 and the circuit board 1402 are attached to opposing sides of the interposer 1404; in other embodiments, the integrated circuit component 1420 and the circuit board 1402 may be attached to a same side of the interposer 1404. In some embodiments, three or more components may be interconnected by way of the interposer 1404.

In some embodiments, the interposer 1404 may be formed as a PCB, including multiple metal layers separated from one another by layers of dielectric material and interconnected by electrically conductive vias. In some embodiments, the interposer 1404 may be formed of an epoxy resin, a fiberglass-reinforced epoxy resin, an epoxy resin with inorganic fillers, a ceramic material, or a polymer material such as polyimide. In some embodiments, the interposer 1404 may be formed of alternate rigid or flexible materials that may include the same materials described above for use in a semiconductor substrate, such as silicon, germanium, and other group III-V and group IV materials. The interposer 1404 may include metal interconnects 1408 and vias 1410, including but not limited to through hole vias 1410-1 (that extend from a first face 1450 of the interposer 1404 to a second face 1454 of the interposer 1404), blind vias 1410-2 (that extend from the first or second faces 1450 or 1454 of the interposer 1404 to an internal metal layer), and buried vias 1410-3 (that connect internal metal layers).

In some embodiments, the interposer 1404 can comprise a silicon interposer. Through silicon vias (TSV) extending through the silicon interposer can connect connections on a first face of a silicon interposer to an opposing second face of the silicon interposer. In some embodiments, an interposer 1404 comprising a silicon interposer can further comprise one or more routing layers to route connections on a first face of the interposer 1404 to an opposing second face of the interposer 1404.

The interposer 1404 may further include embedded devices 1414, including both passive and active devices. Such devices may include, but are not limited to, capacitors, decoupling capacitors, resistors, inductors, fuses, diodes, transformers, sensors, electrostatic discharge (ESD) devices, and memory devices. More complex devices such as radio frequency devices, power amplifiers, power management devices, antennas, arrays, sensors, and microelectromechanical systems (MEMS) devices may also be formed on the interposer 1404. The package-on-interposer structure 1436 may take the form of any of the package-on-interposer structures known in the art. In embodiments where the interposer is a non-printed circuit board The integrated circuit device assembly 1400 may include an integrated circuit component 1424 coupled to the first face 1440 of the circuit board 1402 by coupling components 1422. The coupling components 1422 may take the form of any of the embodiments discussed above with reference to the coupling components 1416, and the integrated circuit component 1424 may take the form of any of the embodiments discussed above with reference to the integrated circuit component 1420.

The integrated circuit device assembly 1400 illustrated in FIG. 14 includes a package-on-package structure 1434 coupled to the second face 1442 of the circuit board 1402 by coupling components 1428. The package-on-package structure 1434 may include an integrated circuit component 1426 and an integrated circuit component 1432 coupled together by coupling components 1430 such that the integrated circuit component 1426 is disposed between the circuit board 1402 and the integrated circuit component 1432. The coupling components 1428 and 1430 may take the form of any of the embodiments of the coupling components 1416 discussed above, and the integrated circuit components 1426 and 1432 may take the form of any of the embodiments of the integrated circuit component 1420 discussed above. The package-on-package structure 1434 may be configured in accordance with any of the package-on-package structures known in the art.

Figure 15:
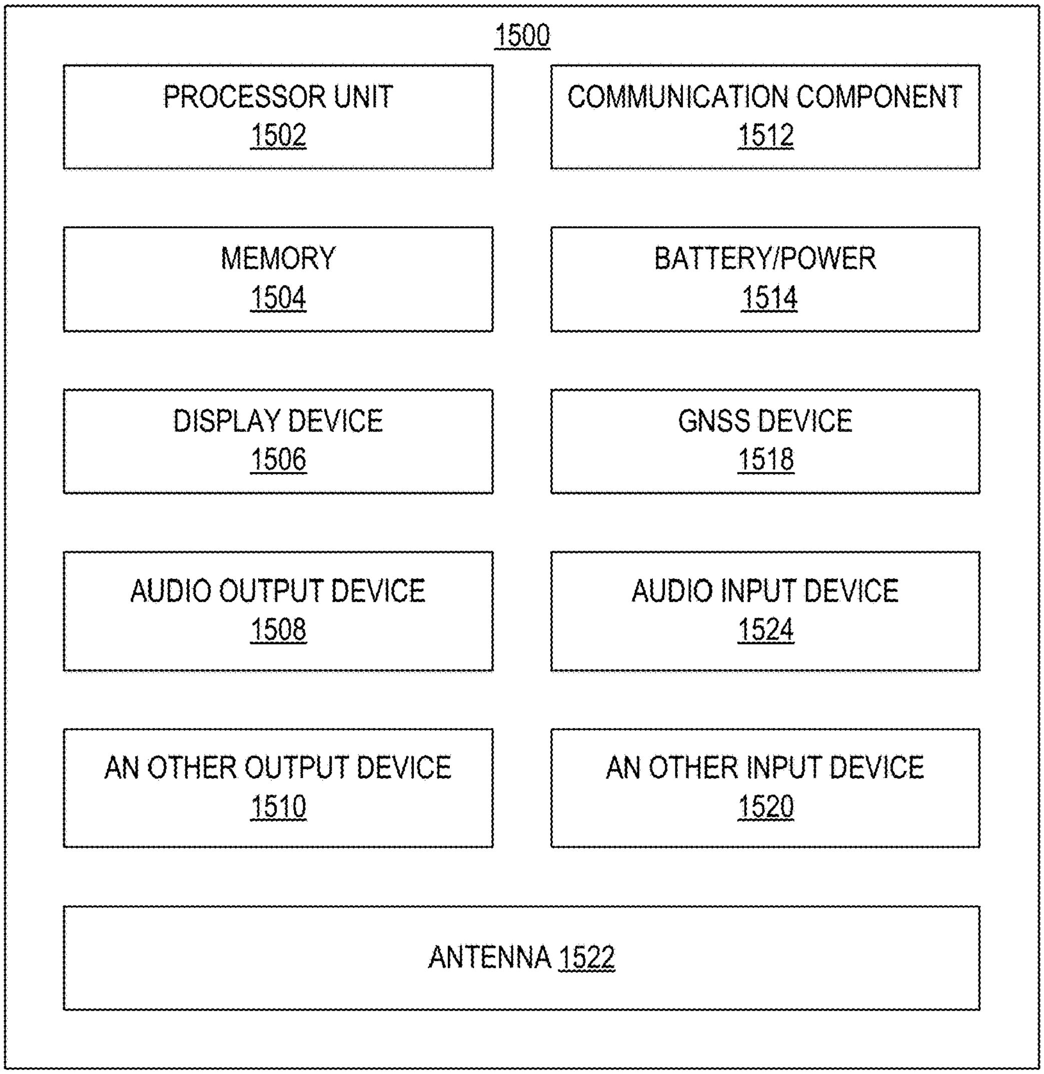
FIG. 15 is a block diagram of an example electrical device that may include a microelectronic assembly, in accordance with any of the embodiments disclosed herein.

FIG. 15 is a block diagram of an example electrical device 1500 that may include one or more of the systems 100 disclosed herein. For example, any suitable ones of the components of the electrical device 1500 may include one or more of the integrated circuit device assemblies 1400, integrated circuit components 1420, integrated circuit devices 1200, or integrated circuit dies 1102 disclosed herein, and may be arranged in any of the systems 100 disclosed herein. A number of components are illustrated in FIG. 15 as included in the electrical device 1500, but any one or more of these components may be omitted or duplicated, as suitable for the application. In some embodiments, some or all of the components included in the electrical device 1500 may be attached to one or more motherboards mainboards, or system boards. In some embodiments, one or more of these components are fabricated onto a single system-on-a-chip (SoC) die.

Additionally, in various embodiments, the electrical device 1500 may not include one or more of the components illustrated in FIG. 15, but the electrical device 1500 may include interface circuitry for coupling to the one or more components. For example, the electrical device 1500 may not include a display device 1506, but may include display device interface circuitry (e.g., a connector and driver circuitry) to which a display device 1506 may be coupled. In another set of examples, the electrical device 1500 may not include an audio input device 1524 or an audio output device 1508, but may include audio input or output device interface circuitry (e.g., connectors and supporting circuitry) to which an audio input device 1524 or audio output device 1508 may be coupled.

The electrical device 1500 may include one or more processor units 1502 (e.g., one or more processor units). As used herein, the terms "processor unit", "processing unit" or "processor" may refer to any device or portion of a device that processes electronic data from registers and/or memory to transform that electronic data into other electronic data that may be stored in registers and/or memory. The processor unit 1502 may include one or more digital signal processors (DSPs), application-specific integrated circuits (ASICs), central processing units (CPUs), graphics processing units (GPUs), general-purpose GPUs (GPGPUs), accelerated processing units (APUs), field-programmable gate arrays (FPGAs), neural network processing units (NPUs), data processor units (DPUs), accelerators (e.g., graphics accelerator, compression accelerator, artificial intelligence accelerator), controller cryptoprocessors (specialized processors that execute cryptographic algorithms within hardware), server processors, controllers, or any other suitable type of processor units. As such, the processor unit can be referred to as an XPU (or xPU).

The electrical device 1500 may include a memory 1504, which may itself include one or more memory devices such as volatile memory (e.g., dynamic random access memory (DRAM), static random-access memory (SRAM)), non-volatile memory (e.g., read-only memory (ROM), flash memory, chalcogenide-based phase-change non-voltage memories), solid state memory, and/or a hard drive. In some embodiments, the memory 1504 may include memory that is located on the same integrated circuit die as the processor unit 1502. This memory may be used as cache memory (e.g., Level 1 (L1), Level 2 (L2), Level 3 (L3), Level 4 (L4), Last Level Cache (LLC)) and may include embedded dynamic random access memory (eDRAM) or spin transfer torque magnetic random access memory (STT-MRAM).

In some embodiments, the electrical device 1500 can comprise one or more processor units 1502 that are heterogeneous or asymmetric to another processor unit 1502 in the electrical device 1500. There can be a variety of differences between the processing units 1502 in a system in terms of a spectrum of metrics of merit including architectural, microarchitectural, thermal, power consumption characteristics, and the like. These differences can effectively manifest themselves as asymmetry and heterogeneity among the processor units 1502 in the electrical device 1500.

In some embodiments, the electrical device 1500 may include a communication component 1512 (e.g., one or more communication components). For example, the communication component 1512 can manage wireless communications for the transfer of data to and from the electrical device 1500. The term "wireless" and its derivatives may be used to describe circuits, devices, systems, methods, techniques, communications channels, etc., that may communicate data through the use of modulated electromagnetic radiation through a nonsolid medium. The term "wireless" does not imply that the associated devices do not contain any wires, although in some embodiments they might not.

The communication component 1512 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication component 1512 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication component 1512 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication component 1512 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication component 1512 may operate in accordance with other wireless protocols in other embodiments. The electrical device 1500 may include an antenna 1522 to facilitate wireless communications and/or to receive other wireless communications (such as AM or FM radio transmissions).

In some embodiments, the communication component 1512 may manage wired communications, such as electrical, optical, or any other suitable communication protocols (e.g., IEEE 802.3 Ethernet standards). As noted above, the communication component 1512 may include multiple communication components. For instance, a first communication component 1512 may be dedicated to shorter-range wireless communications such as Wi-Fi or Bluetooth, and a second communication component 1512 may be dedicated to longer-range wireless communications such as global positioning system (GPS), EDGE, GPRS, CDMA, WiMAX, LTE, EV-DO, or others. In some embodiments, a first communication component 1512 may be dedicated to wireless communications, and a second communication component 1512 may be dedicated to wired communications.

The electrical device 1500 may include battery/power circuitry 1514. The battery/power circuitry 1514 may include one or more energy storage devices (e.g., batteries or capacitors) and/or circuitry for coupling components of the electrical device 1500 to an energy source separate from the electrical device 1500 (e.g., AC line power).

The electrical device 1500 may include a display device 1506 (or corresponding interface circuitry, as discussed above). The display device 1506 may include one or more embedded or wired or wirelessly connected external visual indicators, such as a heads-up display, a computer monitor, a projector, a touchscreen display, a liquid crystal display (LCD), a light-emitting diode display, or a flat panel display.

The electrical device 1500 may include an audio output device 1508 (or corresponding interface circuitry, as discussed above). The audio output device 1508 may include any embedded or wired or wirelessly connected external device that generates an audible indicator, such speakers, headsets, or earbuds.

The electrical device 1500 may include an audio input device 1524 (or corresponding interface circuitry, as discussed above). The audio input device 1524 may include any embedded or wired or wirelessly connected device that generates a signal representative of a sound, such as microphones, microphone arrays, or digital instruments (e.g., instruments having a musical instrument digital interface (MIDI) output). The electrical device 1500 may include a Global Navigation Satellite System (GNSS) device 1518 (or corresponding interface circuitry, as discussed above), such as a Global Positioning System (GPS) device. The GNSS device 1518 may be in communication with a satellite-based system and may determine a geolocation of the electrical device 1500 based on information received from one or more GNSS satellites, as known in the art.

The electrical device 1500 may include an other output device 1510 (or corresponding interface circuitry, as discussed above). Examples of the other output device 1510 may include an audio codec, a video codec, a printer, a wired or wireless transmitter for providing information to other devices, or an additional storage device.

The electrical device 1500 may include an other input device 1520 (or corresponding interface circuitry, as discussed above). Examples of the other input device 1520 may include an accelerometer, a gyroscope, a compass, an image capture device (e.g., monoscopic or stereoscopic camera), a trackball, a trackpad, a touchpad, a keyboard, a cursor control device such as a mouse, a stylus, a touchscreen, proximity sensor, microphone, a bar code reader, a Quick Response (QR) code reader, electrocardiogram (ECG) sensor, PPG (photoplethysmogram) sensor, galvanic skin response sensor, any other sensor, or a radio frequency identification (RFID) reader.

The electrical device 1500 may have any desired form factor, such as a hand-held or mobile electrical device (e.g., a cell phone, a smart phone, a mobile internet device, a music player, a tablet computer, a laptop computer, a 2-in-1 convertible computer, a portable all-in-one computer, a netbook computer, an ultrabook computer, a personal digital assistant (PDA), an ultra mobile personal computer, a portable gaming console, etc.), a desktop electrical device, a server, a rack-level computing solution (e.g., blade, tray or sled computing systems), a workstation or other networked computing component, a printer, a scanner, a monitor, a set-top box, an entertainment control unit, a stationary gaming console, smart television, a vehicle control unit, a digital camera, a digital video recorder, a wearable electrical device or an embedded computing system (e.g., computing systems that are part of a vehicle, smart home appliance, consumer electronics product or equipment, manufacturing equipment). In some embodiments, the electrical device 1500 may be any other electronic device that processes data. In some embodiments, the electrical device 1500 may comprise multiple discrete physical components. Given the range of devices that the electrical device 1500 can be manifested as in various embodiments, in some embodiments, the electrical device 1500 can be referred to as a computing device or a computing system.

EXAMPLES

Illustrative examples of the technologies disclosed herein are provided below. An embodiment of the technologies may include any one or more, and any combination of, the examples described below.

Example 1 includes an apparatus comprising a photonic integrated circuit (PIC) die comprising one or more waveguides that extend parallel to a top surface of the PIC die; and one or more vertical couplers, wherein individual vertical couplers of the one or more vertical couplers are to couple light from individual waveguides of the one or more waveguides out of the top surface of the PIC die; and a microoptic substrate mounted on the top surface of the PIC die, the microoptic substrate comprising one or more first mirrors defined in the microoptic substrate; and one or more second mirrors defined in the microoptic substrate, wherein the one or more first mirrors are to reflect light from the one or more vertical couplers to a direction substantially parallel to the top surface of the PIC die, wherein individual second mirrors of the one or more second mirrors are to collimate light reflected by the one or more first mirrors from the one or more vertical couplers.

Example 2 includes the subject matter of Example 1, and wherein the microoptic substrate comprises a bottom surface, wherein the bottom surface of the microoptic substrate is adjacent the top surface of the PIC die, wherein individual second mirrors of the one or more second mirrors are to reflect light reflected by the one or more first mirrors from the one or more vertical couplers out of a top surface of the microoptic substrate opposite the bottom surface of the microoptic substrate.

Example 3 includes the subject matter of any of Examples 1 and 2, and wherein individual first mirrors of the one or more first mirrors are flat mirrors.

Example 4 includes the subject matter of any of Examples 1-3, and wherein individual first mirrors of the one or more first mirrors are convex such that one or more beams from the one or more vertical couplers are to diverge at a higher rate after reflection off the one or more first mirrors.

Example 5 includes the subject matter of any of Examples 1-4, and wherein the one or more first mirrors comprise one or more reflective surfaces disposed in a cavity extending from a top surface of the microoptic substrate.

Example 6 includes the subject matter of any of Examples 1-5, and wherein the one or more first mirrors comprise one or more reflective surfaces disposed in a cavity extending from a bottom surface of the microoptic substrate.

Example 7 includes the subject matter of any of Examples 1-6, and wherein individual second mirrors of the one or more second mirrors are to collimate light reflected by the one or more first mirrors from the one or more vertical couplers into beams with mode field diameters less than 100 micrometers.

Example 8 includes the subject matter of any of Examples 1-7, and wherein individual first mirrors of the one or more first mirrors defined in the microoptic substrate comprise a reflective surface.

Example 9 includes the subject matter of any of Examples 1-8, and wherein the reflective surface of individual first mirrors of the one or more first mirrors comprises aluminum or silver.

Example 10 includes the subject matter of any of Examples 1-9, and wherein the reflective surface of individual first mirrors of the one or more first mirrors comprises a dielectric stack.

Example 11 includes the subject matter of any of Examples 1-10, and wherein individual second mirrors of the one or more second mirrors defined in the microoptic substrate are reflective due to total internal reflection.

Example 12 includes the subject matter of any of Examples 1-11, and wherein the microoptic substrate has a thickness less than 200 micrometers.

Example 13 includes an apparatus comprising a photonic integrated circuit (PIC) die comprising one or more waveguides that extend parallel to a top surface of the PIC die; and means for coupling light from the one or more waveguides out of the top surface of the PIC die; and a microoptic substrate mounted on the top surface of the PIC die, the microoptic substrate comprising means for reflecting light coupled out of the top surface of the PIC die by the means for coupling light from the one or more waveguides to a direction substantially parallel to the top surface of the PIC die; and means for collimating light reflected by the means for reflecting light coupled out of the top surface of the PIC die.

Example 14 includes the subject matter of Example 13, and wherein the microoptic substrate comprises a bottom surface, wherein the bottom surface of the microoptic substrate is adjacent the top surface of the PIC die, wherein the means for collimating light reflected by the means for reflecting light coupled out of the top surface of the PIC die are to reflect light out of a top surface of the microoptic substrate opposite the bottom surface of the microoptic substrate.

Example 15 includes the subject matter of any of Examples 13 and 14, and wherein the means for reflecting light coupled out of the top surface of the PIC die by the means for coupling light from the one or more waveguides comprises one or more flat mirrors.

Example 16 includes the subject matter of any of Examples 13-15, and wherein the means for reflecting light coupled out of the top surface of the PIC die by the means for coupling light from the one or more waveguides comprises one or more convex mirrors.

Example 17 includes the subject matter of any of Examples 13-16, and wherein the means for reflecting light coupled out of the top surface of the PIC die by the means for coupling light from the one or more waveguides comprises one or more reflective surfaces disposed in a cavity extending from a top surface of the microoptic substrate.

Example 18 includes the subject matter of any of Examples 13-17, and wherein the means for reflecting light coupled out of the top surface of the PIC die by the means for coupling light from the one or more waveguides comprises one or more reflective surfaces disposed in a cavity extending from a bottom surface of the microoptic substrate.

Example 19 includes the subject matter of any of Examples 13-18, and wherein the means for collimating light reflected by the means for reflecting light coupled out of the top surface of the PIC die are to collimate light into beams with mode field diameters less than 100 micrometers.

Example 20 includes the subject matter of any of Examples 13-19, and wherein the means for reflecting light coupled out of the top surface of the PIC die by the means for coupling light from the one or more waveguides comprise a reflective surface.

Example 21 includes the subject matter of any of Examples 13-20, and wherein the reflective surface comprises aluminum or silver.

Example 22 includes the subject matter of any of Examples 13-21, and wherein the reflective surface comprises a dielectric stack.

Example 23 includes the subject matter of any of Examples 13-22, and wherein the means for reflecting light coupled out of the top surface of the PIC die by the means for coupling light from the one or more waveguides are reflective due to total internal reflection.

Example 24 includes the subject matter of any of Examples 13-23, and wherein the microoptic substrate has a thickness less than 200 micrometers.

Example 25 includes a method comprising forming a first cavity and a second cavity in a glass substrate using selective laser etching; forming one or more first mirrors in the first cavity; forming one or more second mirrors in the second cavity; and mounting the glass substrate on a photonic integrated circuit (PIC) die, wherein the PIC die comprises one or more vertical couplers to couple light from one or more waveguides in the PIC die out of a top surface of the PIC die, wherein the one or more first mirrors are to reflect light from the one or more vertical couplers to a direction substantially parallel to the top surface of the PIC die, wherein individual second mirrors of the one or more second mirrors are to collimate light reflected by the one or more first mirrors from the one or more vertical couplers.

Example 26 includes the subject matter of Example 25, and wherein the glass substrate comprises a bottom surface adjacent the top surface of the PIC die, wherein the glass substrate comprises a top surface opposite the bottom surface of the PIC die, wherein forming the first cavity comprises forming the first cavity extending from the top surface of the glass substrate.

Example 27 includes the subject matter of any of Examples 25 and 26, and wherein the glass substrate comprises a bottom surface adjacent the top surface of the PIC die, wherein the glass substrate comprises a top surface opposite the bottom surface of the PIC die, wherein forming the first cavity comprises forming the first cavity extending from the bottom surface of the glass substrate.

Example 28 includes the subject matter of any of Examples 25-27, and wherein mounting the glass substrate on the PIC die comprises mounting the glass substrate on a PIC wafer, further comprising singulating the PIC wafer into a plurality of separate PIC dies after mounting the glass substrate.

Example 29 includes the subject matter of any of Examples 25-28, and further including thinning the glass substrate before singulating the PIC wafer.

Example 30 includes the subject matter of any of Examples 25-29, and wherein individual first mirrors of the one or more first mirrors are flat mirrors.

Example 31 includes the subject matter of any of Examples 25-30, and wherein individual first mirrors of the one or more first mirrors are convex such that one or more beams from the one or more vertical couplers are to diverge at a higher rate after reflection off the one or more first mirrors.

Example 32 includes the subject matter of any of Examples 25-31, and wherein individual second mirrors of the one or more second mirrors are to collimate light reflected by the one or more first mirrors from the one or more vertical couplers into beams with mode field diameters less than 100 micrometers.

Example 33 includes the subject matter of any of Examples 25-32, and wherein individual first mirrors of the one or more first mirrors defined in the glass substrate comprise a reflective surface.

Example 34 includes the subject matter of any of Examples 25-33, and wherein the reflective surface of individual first mirrors of the one or more first mirrors comprises aluminum or silver.

Example 35 includes the subject matter of any of Examples 25-34, and wherein the reflective surface of individual first mirrors of the one or more first mirrors comprises a dielectric stack.

Example 36 includes the subject matter of any of Examples 25-35, and wherein individual second mirrors of the one or more second mirrors defined in the glass substrate are reflective due to total internal reflection.

The invention claimed is:

1. An apparatus comprising:

a photonic integrated circuit (PIC) die comprising:

one or more waveguides that extend parallel to a top surface of the PIC die; and one or more vertical couplers, wherein individual vertical couplers of the one or more vertical couplers are to couple light from individual waveguides of the one or more waveguides out of the top surface of the PIC die; and a microoptic substrate mounted on the top surface of the PIC die, the microoptic substrate comprising:

one or more first mirrors defined in the microoptic substrate; and one or more second mirrors defined in the microoptic substrate, wherein the one or more first mirrors are to reflect light from the one or more vertical couplers to a direction substantially parallel to the top surface of the PIC die, wherein individual second mirrors of the one or more second mirrors are to collimate light reflected by the one or more first mirrors from the one or more vertical couplers.

2. The apparatus of claim 1, wherein the microoptic substrate comprises a bottom surface, wherein the bottom surface of the microoptic substrate is adjacent the top surface of the PIC die, wherein individual second mirrors of the one or more second mirrors are to reflect light reflected by the one or more first mirrors from the one or more vertical couplers out of a top surface of the microoptic substrate opposite the bottom surface of the microoptic substrate.

3. The apparatus of claim 1, wherein individual first mirrors of the one or more first mirrors are flat mirrors.

4. The apparatus of claim 1, wherein individual first mirrors of the one or more first mirrors are convex such that one or more beams from the one or more vertical couplers are to diverge at a higher rate after reflection off the one or more first mirrors.

5. The apparatus of claim 1, wherein the one or more first mirrors comprise one or more reflective surfaces disposed in a cavity extending from a top surface of the microoptic substrate.

6. The apparatus of claim 1, wherein the one or more first mirrors comprise one or more reflective surfaces disposed in a cavity extending from a bottom surface of the microoptic substrate.

7. The apparatus of claim 1, wherein individual second mirrors of the one or more second mirrors are to collimate light reflected by the one or more first mirrors from the one or more vertical couplers into beams with mode field diameters less than 100 micrometers.

8. The apparatus of claim 1, wherein individual first mirrors of the one or more first mirrors defined in the microoptic substrate comprise a reflective surface.

9. The apparatus of claim 8, wherein the reflective surface of individual first mirrors of the one or more first mirrors comprises aluminum or silver.

10. The apparatus of claim 8, wherein the reflective surface of individual first mirrors of the one or more first mirrors comprises a dielectric stack.

11. The apparatus of claim 1, wherein individual second mirrors of the one or more second mirrors defined in the microoptic substrate are reflective due to total internal reflection.

12. The apparatus of claim 1, wherein the microoptic substrate has a thickness less than 200 micrometers.

13. An apparatus comprising:

a photonic integrated circuit (PIC) die comprising:

one or more waveguides that extend parallel to a top surface of the PIC die; and means for coupling light from the one or more waveguides out of the top surface of the PIC die; and a microoptic substrate mounted on the top surface of the PIC die, the microoptic substrate comprising:

means for reflecting light coupled out of the top surface of the PIC die by the means for coupling light from the one or more waveguides to a direction substantially parallel to the top surface of the PIC die; and means for collimating light reflected by the means for reflecting light coupled out of the top surface of the PIC die.

14. The apparatus of claim 13, wherein the microoptic substrate comprises a bottom surface, wherein the bottom surface of the microoptic substrate is adjacent the top surface of the PIC die, wherein the means for collimating light reflected by the means for reflecting light coupled out of the top surface of the PIC die are to reflect light out of a top surface of the microoptic substrate opposite the bottom surface of the microoptic substrate.

15. The apparatus of claim 13, wherein the means for reflecting light coupled out of the top surface of the PIC die by the means for coupling light from the one or more waveguides comprises one or more convex mirrors.

16. The apparatus of claim 13, wherein the means for reflecting light coupled out of the top surface of the PIC die by the means for coupling light from the one or more waveguides comprises one or more reflective surfaces disposed in a cavity extending from a top surface of the microoptic substrate.

17. The apparatus of claim 13, wherein the means for reflecting light coupled out of the top surface of the PIC die by the means for coupling light from the one or more waveguides comprises one or more reflective surfaces disposed in a cavity extending from a bottom surface of the microoptic substrate.

18. The apparatus of claim 13, wherein the means for collimating light reflected by the means for reflecting light coupled out of the top surface of the PIC die are to collimate light into beams with mode field diameters less than 100 micrometers.

19. The apparatus of claim 13, wherein the means for reflecting light coupled out of the top surface of the PIC die by the means for coupling light from the one or more waveguides comprise a reflective surface.

20. A method comprising:

forming a first cavity and a second cavity in a glass substrate using selective laser etching;

forming one or more first mirrors in the first cavity;

forming one or more second mirrors in the second cavity; and mounting the glass substrate on a photonic integrated circuit (PIC) die, wherein the PIC die comprises one or more vertical couplers to couple light from one or more waveguides in the PIC die out of a top surface of the PIC die, wherein the one or more first mirrors are to reflect light from the one or more vertical couplers to a direction substantially parallel to the top surface of the PIC die, wherein individual second mirrors of the one or more second mirrors are to collimate light reflected by the one or more first mirrors from the one or more vertical couplers.

21. The method of claim 20, wherein the glass substrate comprises a bottom surface adjacent the top surface of the PIC die, wherein the glass substrate comprises a top surface opposite the bottom surface of the PIC die, wherein forming the first cavity comprises forming the first cavity extending from the top surface of the glass substrate.

22. The method of claim 20, wherein the glass substrate comprises a bottom surface adjacent the top surface of the PIC die, wherein the glass substrate comprises a top surface opposite the bottom surface of the PIC die, wherein forming the first cavity comprises forming the first cavity extending from the bottom surface of the glass substrate.

23. The method of claim 20, wherein mounting the glass substrate on the PIC die comprises mounting the glass substrate on a PIC wafer, further comprising singulating the PIC wafer into a plurality of separate PIC dies after mounting the glass substrate.

24. The method of claim 20, wherein individual first mirrors of the one or more first mirrors are convex such that one or more beams from the one or more vertical couplers are to diverge at a higher rate after reflection off the one or more first mirrors.

25. The apparatus of claim 13, wherein the means for collimating light comprises a mirror.

* * * * *